United States Patent
Spiesberger

(10) Patent No.: US 10,915,137 B1
(45) Date of Patent: Feb. 9, 2021

(54) ESTIMATION OF CLOCK SYNCHRONIZATION ERRORS USING TIME DIFFERENCE OF ARRIVAL

(71) Applicant: Scientific Innovations, Inc., Radnor, PA (US)

(72) Inventor: John Louis Spiesberger, Radnor, PA (US)

(73) Assignee: Scientific Innovations, Inc., Radnor, PA (US)

( * ) Notice: Subject to any disclaimer, the term of this patent is extended or adjusted under 35 U.S.C. 154(b) by 0 days.

(21) Appl. No.: 17/068,626

(22) Filed: Oct. 12, 2020

Related U.S. Application Data

(60) Provisional application No. 62/914,397, filed on Oct. 11, 2019, provisional application No. 62/942,626, filed on Dec. 2, 2019.

(51) Int. Cl.
*G06F 1/10* (2006.01)
*G06F 1/12* (2006.01)

(52) U.S. Cl.
CPC . *G06F 1/12* (2013.01); *G06F 1/10* (2013.01)

(58) Field of Classification Search
CPC ..................................... G06F 1/12; G06F 1/10
See application file for complete search history.

(56) References Cited

U.S. PATENT DOCUMENTS

| 6,968,194 | B2 | 11/2005 | Aljadeff et al. |
| 7,030,812 | B2 | 4/2006 | Bekritsky et al. |
| 7,729,707 | B2 | 6/2010 | Aljadeff et al. |
| 8,818,406 | B2 | 8/2014 | Bevan et al. |
| 9,237,541 | B2 | 1/2016 | Zhang et al. |
| 9,960,901 | B2 | 5/2018 | Gorgen et al. |
| 2003/0103475 | A1 | 6/2003 | Heppe et al. |
| 2005/0175038 | A1 | 8/2005 | Carlson et al. |

OTHER PUBLICATIONS

Janson, Thomas et al.; Self-localization Application for iPhone using only ambient sound signals (extended abstract); 2010 International Conference on Indoor Positioning and Indoor Navigation, Zurich (2010).

(Continued)

*Primary Examiner* — Phil K Nguyen
(74) *Attorney, Agent, or Firm* — Louis J. Hoffman; David S. Alavi

(57) ABSTRACT

A method implemented using a programmed computerized machine includes using an estimated uncorrected time-difference-of-arrival (TDOA) for a first signal at first and second sensors, located at first and second sensor locations and coupled to first and second clocks, to calculate a first estimated clock synchronization error (CSE) range that extends (i) from an estimated minimum true TDOA between the sensor locations minus an estimated maximum uncorrected TDOA, (ii) to an estimated maximum true TDOA between the sensor locations minus an estimated minimum uncorrected TDOA. Additional estimated CSE ranges based on additional signals can be used to calculate an estimated cumulative CSE range. A first or cumulative estimated CSE range can be used for calculations with respect to time-dependent signals arriving at one or both sensors, or for adjusting one or both clocks.

22 Claims, 9 Drawing Sheets

(56) References Cited

OTHER PUBLICATIONS

Chen, Xin et al.; Bias reduction for TDOA localization in the presence of receiver position errors and synchronization clock bias; EURASIP Journal on Advances in Signal Processing; 2019:7 (2019).
He; Shuai et al.; Asynchronous Time Difference of Arrival Positioning System; 2012.
Balikci, Henri et al.; Asynchronous-TDOA Localization Final Report; University of Victoria; Dec. 3, 2012.
Li, Zan et al; Highly Accurate Evaluation of GPS Synchronization for TDOA Localization; 2013 IFIP Wireless Days (WD), Valencia; pp. 1-3 (2013).
Yousefi, Siamak; A Joint Localization and Synchronization Technique Using Time of Arrival at Multiple Antenna Receivers; 2013 Asilomar Conference on Signals, Systems and Computers, Pacific Grove, CA; pp. 2017-2021; (2013).
Hannemann, Katrin et al.; Measuring of clock drift rates and static time offsets of ocean bottom stations by means of ambient noise; Geophys. J. Int. (2014) 196, 1034-1042; (2014).
Wang, Yue and Ho, K.C.; TDOA Source Localization in the Presence of Synchronization Clock Bias and Sensor Position Errors; IEEE Transactions on Signal Processing; vol. 61, No. 18, pp. 4532-4544; Sep. 15, 2013.
Diamant, Roee and Lutz, Lampe; Underwater Localization with Time-Synchronization and Propagation Speed Uncertainties; IEEE Transactions on Mobile Computing 12(7), pp. 100-105; 2011.
Fisher, Kenneth; The Navigation Potential Of Signals Of Opportunity-Based Time Difference Of Arrival Measurements (Dissertation); Department Of The Air Force Air University; Air Force Institute Of Technology Wright-Patterson Air Force Base, Ohio; Mar. 2005.
Sangdeok, Kim and Chong, Jong-Who; An Efficient TDOA-Based Localization Algorithm without Synchronization between Base Stations; Hindawi Publishing Corporation; International Journal of Distributed Sensor Networks; vol. 2015, Article ID 832351 (2015).
Lazik, Patrick et al.; Ultrasonic Time Synchronization and Ranging on Smartphones; 21st IEEE Real-Time and Embedded Technology and Applications Symposium; p. 108-118; 2015.
Noel, Wilfred E.; Signals of Opportunity Navigation Using Wi-Fi Signals (Thesis); Department Of The Air Force Air University; Air Force Institute Of Technology, Wright-Patterson Air Force Base, Ohio; Mar. 2011.
Tiemann, Janis et al.; Multi-User Interference and Wireless Clock Synchronization in TDOA-based UWB Localization; Seventh International Conference on Indoor Positioning and Indoor Navigation (IPIN), Alcala de Henares, Madrid, Spain, Oct. 2016.
Wendeberg, Johannes et al.; Self-Localization based on Ambient Signals; Theoretical Computer Science 453, pp. 98-109; 2012.
Xiong, Hui et al.; Robust TDOA Localization Algorithm for Asynchronous Wireless Sensor Networks; Hindawi Publishing Corporation; International Journal of Distributed Sensor Networks; vol. 2015, Article ID 598747; 2015.

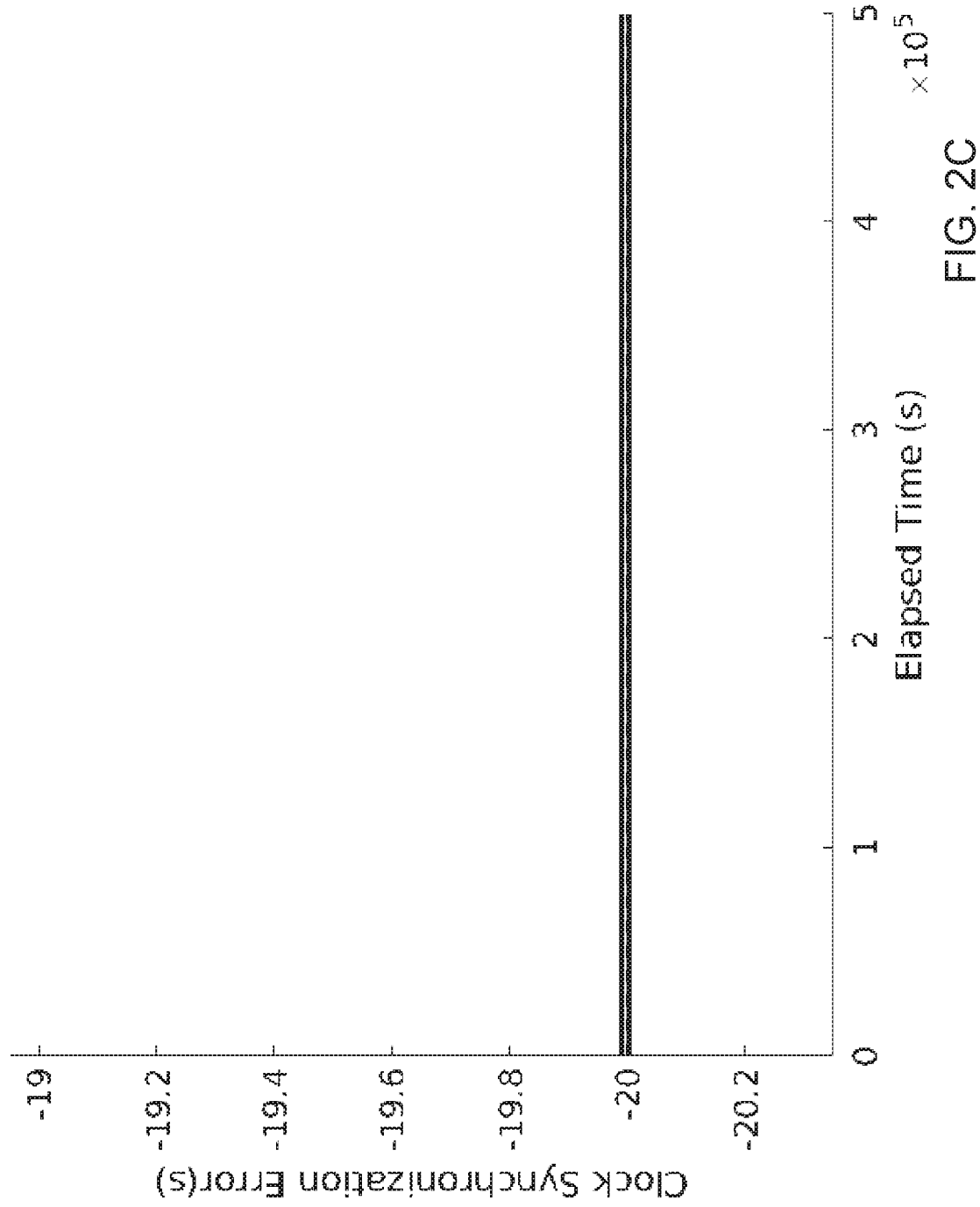

ESTIMATION OF CLOCK SYNCHRONIZATION ERRORS USING TIME DIFFERENCE OF ARRIVAL

CROSS REFERENCE TO RELATED APPLICATIONS

This application claims benefit of U.S. provisional App. Ser. No. 62/914,397, filed Oct. 11, 2019, and U.S. provisional App. Ser. No. 62/942,626, filed Nov. 23, 2019, both of which are hereby incorporated by reference.

FIELD OF THE INVENTION

The field of the present invention relates to computerized data processing or analysis of signals (sonic, electromagnetic, or other) representative of signal emission events. In particular, computerized machines and methods are disclosed for estimating clock synchronization errors between different clocks based on time difference of arrival (TDOA) of one or more signals received at corresponding locations of sensors coupled to the clocks.

BACKGROUND

Numerous techniques exist wherein multiple sensors receive signals at multiple locations, and those received signals are processed or analyzed to yield information pertaining to the sources of those signals (e.g., estimated number or types of the sources, or estimated locations of the sources). In many such techniques, the arrival time of a given signal at a given sensor and the location of the sensor are included in the processing or analysis. In many instances each sensor has its own clock for recording the arrival times of signals or providing a time scale (i.e., temporal offset or origin and temporal scale) for those signals. Each sensor can generate discrete or time-series amplitude, magnitude, intensity, or other signal data coupled with temporal data from the corresponding clock. The temporal data can be a single estimated arrival time for a corresponding discrete signal, a time scale for a time series of a signal waveform, or other suitable temporal data that characterizes a received signal.

Even if initially synchronized, clocks used in such techniques typically will exhibit relative drift over time, resulting in clock synchronization errors (CSEs). CSEs can cause the ensuing processing or analysis to yield results that are inaccurate or include unacceptably large uncertainties, or CSEs can increase computation time or resources needed to analyze or process that data (e.g., when data within larger temporal windows should be analyzed due to clock uncertainties). In some instances active or ongoing synchronization of clocks is not possible, not practicable, or too expensive.

SUMMARY

A method is implemented using a programmed computerized machine and includes using an estimated uncorrected time-difference-of-arrival (TDOA) for a first signal at first and second sensors for calculating a first estimated clock synchronization error (CSE) range. The first sensor is located at a corresponding estimated first sensor location and is operatively coupled to a first clock; the second sensor is located at a corresponding estimated second sensor location and is operatively coupled to a second clock. For notational purposes, a positive value for the CSE is considered as meaning that the second clock is ahead of the first clock; a negative value for the CSE means the second clock is behind the first clock. Of course, a user can choose which clock (and associated sensor) is designated "first" and which is designated "second." The first estimated CSE range between the first clock and the second clock extends (i) from an estimated minimum true TDOA (minTDOA), for the same general signal type as the first signal, between the first estimated sensor location and the second estimated sensor location, minus an estimated maximum uncorrected TDOA for the first signal, (ii) to an estimated maximum true TDOA (maxTDOA), for the same general signal type as the first signal, between the first estimated sensor location and the second estimated sensor location minus an estimated minimum uncorrected TDOA for the first signal. An uncorrected TDOA is positive when the first signal appears to arrive later at the first sensor as measured by the first and second clocks with whatever CSE might be present. A positive CSE indicates that the second clock runs ahead of the first clock, i.e., at any given time the second clock registers a time later than the first clock.

The first estimated CSE range can be used to perform a computerized calculation with respect to one or more time-dependent signals arriving at the first sensor or the second sensor. Such calculations can include, e.g., detecting, processing, filtering, isolating, identifying, classifying, source-separating, or source-locating one or more time-dependent signals arriving at the first sensor or the second sensor. Instead or in addition, the first estimated CSE range can be used to adjust one or both of the first or second clocks, or temporal data from one or both of the first or second clocks, to compensate at least partly for a CSE within the first estimated CSE range.

The method can further include using an estimated uncorrected time-difference-of-arrival (TDOA) for one or more additional signals at the first sensor and at the second sensor for calculating one or more corresponding additional initial estimated CSE ranges, and calculating an estimated cumulative CSE range. Each additional estimated CSE range between the first clock and the second clock extends (i) from a minTDOA, for the same general signal type as the corresponding additional signal, between the first estimated sensor location and the second estimated sensor location, minus a corresponding estimated maximum uncorrected TDOA for the corresponding additional signal, (ii) to a maxTDOA, for the same general signal type as the corresponding additional signal, between the first estimated sensor location and the second estimated sensor location minus a corresponding estimated minimum uncorrected TDOA for the corresponding additional signal. The estimated cumulative CSE range between the first clock and the second clock is calculated as a combination of two or more among the first estimated CSE range and the additional estimated CSE ranges. The estimated cumulative CSE range can be used to perform a computerized calculation with respect to one or more time-dependent signals arriving at the first sensor or the second sensor, including those listed above. Instead or in addition, the estimated cumulative CSE range can be used to adjust one or both of the first or second clocks, or temporal data from one or both of the first or second clocks, to compensate at least partly for a CSE within the first estimated CSE range.

Objects and advantages pertaining to clock synchronization errors may become apparent upon referring to the example illustrated in the drawings and disclosed in the following written description or appended claims.

This Summary is provided to introduce a selection of concepts in a simplified form that are further described below in the Detailed Description. This Summary is not

BRIEF DESCRIPTION OF THE DRAWINGS

FIGS. 2A through 2D are graphs showing the evolution of an estimated cumulative CSE range as additional estimated CSE ranges are combined, with the estimated CSE ranges arising from simulated signals propagating from the sources of FIG. 1 and arriving at the sensors of FIG. 1. The true CSE between the clocks is fixed in this simulation and is indicated by the dashed line. FIGS. 2A and 2B show how the estimated CSE range evolves moving forward in time, while FIGS. 2C and 2D show how the estimated CSE range evolves when the analysis is done backward incorporating the forward-calculated cumulative estimated CSE ranges.

FIGS. 3A and 3B show how the estimated CSE range evolves moving forward in time, while FIGS. 3C and 3D show how the estimated CSE range evolves when the analysis is done backward incorporating the forward-calculated cumulative estimated CSE ranges.

Figure 1:
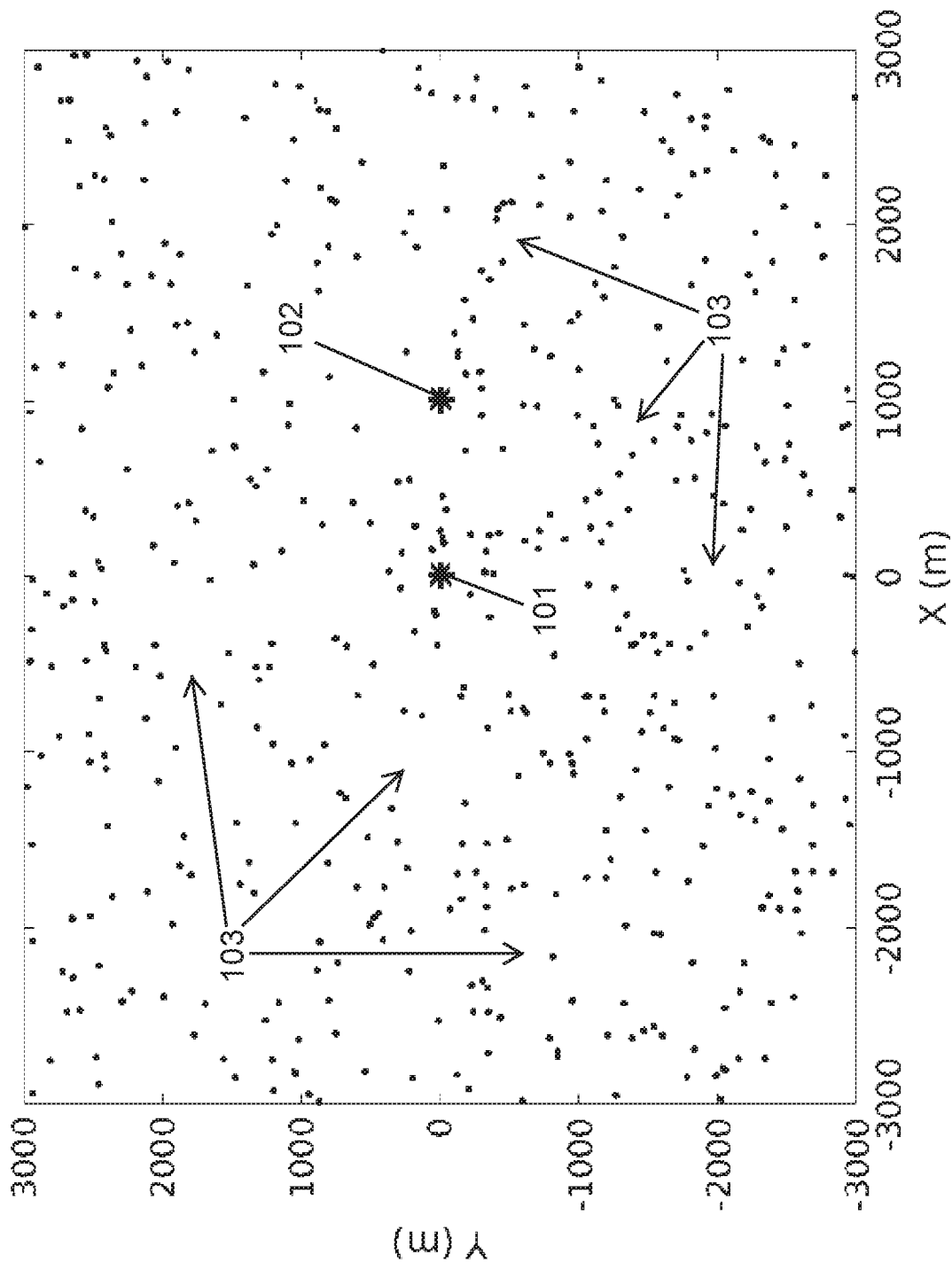
FIG. 1 depicts schematically locations of first and second sensors and 500 signal sources at corresponding randomly chosen locations.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

Desirable methods for estimating clock synchronization error (CSE) between two or more clocks may in certain circumstances avoid requiring active or ongoing synchronization of the clocks. The estimated clock synchronization error can be used in processing or analysis of sensor data that includes one or more TDOAs of signals at sensors operatively coupled to the clocks, without necessarily requiring correction or adjustment of the clocks.

In the present description and claims, any quantity, range, or interval that is described as "estimated" can be characterized in any one or more suitable ways, including but not limited to use of: a confidence interval at any suitable confidence level (e.g., 100%, 95%, 90%, and so forth); a probability distribution; one or more statistical parameters (e.g., mean, median, mode, variance, standard deviation, higher moments, widths of a probability distribution, and so forth); or various functions of the preceding (e.g., products, quotients, sums, differences, overlaps, convolutions, auto- or cross-correlations, time-propagated distributions, composite distributions, and so forth). A quantity that is "exactly" known falls within the "estimated" description as being described by, e.g., a delta function probability distribution, or a 100% confidence "interval" that includes only a single point. In addition, in the present description and claims the following sign conventions shall apply. The phrase "difference between X and Y" shall be interpreted as "X minus Y", while the "difference between Y and X" shall be interpreted as "Y minus X". Descriptors such as larger, smaller, greater, lesser, greater than, or less than refer to signed quantities (not magnitudes or absolute values), so that, e.g., any negative quantity would be less than any positive quantity, regardless of magnitudes. All times or time differences recited are signed quantities, with positive times being later than negative times and larger times being later than smaller times. A time difference of arrival (TDOA) between signals A and B is defined as the arrival time of A minus the arrival time of B, while a TDOA between signals B and A is defined as the arrival time of B minus the arrival time of A. Accordingly, a positive TDOA between signals A and B (equivalently, a negative TDOA between signals B and A) indicates that signal A has a later arrival time than that of signal B.

In some examples, estimating an uncorrected TDOA for a given signal at the first sensor and at the second sensor comprises estimating a difference between (i) a corresponding first uncorrected estimated arrival time of the signal at the first sensor and (ii) a corresponding second uncorrected estimated arrival time of the signal at the second sensor. The first uncorrected estimated arrival time is determined using the first clock; the second uncorrected estimated arrival time is determined with the second clock. "Uncorrected" indicates that the TDOAs or arrival times include whatever CSE, known, estimated, or unknown, might exist between the first and second clocks. The arrival time for a signal can be based on the raw signal itself or on a function of that signal, e.g., the phase component of a complex demodulated signal or frequency-filtered signal, an amplitude envelope, a spectrogram or a selected portion thereof, or other suitable function. Such a difference-estimation procedure can be employed for discrete signals for which an arrival time can be estimated (e.g., an impulsive signal comprising a single intensity or amplitude peak, or a transient signal having features that can be discerned).

In some examples, estimating an uncorrected TDOA for a given signal at the first sensor and at the second sensor comprises calculating a cross-correlation-like function of corresponding first and second uncorrected waveforms produced by the given signal at the first and second sensors. The waveform for a signal can be based on the raw signal itself or on a function of that signal, e.g., the phase component of a complex demodulated signal or frequency-filtered signal, an amplitude envelope, a spectrogram or a selected portion thereof, or other suitable function. The waveforms are "uncorrected" in that their corresponding timescales include whatever CSE, known, estimated, or unknown, might exist between the first and second clocks. The cross-correlation-like function (referred to herein simply as a cross-correlation) can be calculated in any suitable way, including, e.g., cross-correlating only the phase of the waveforms' time series, cross-correlating only the amplitude of the waveforms' time series, modifying the waveforms before cross-correlating such as frequency filtering or pre-whitening the signal, generalized cross-correlation, cross-correlating spectrograms of the waveforms, etc. The time scale (i.e., temporal origin or offset and temporal scale) for the first waveform is determined by the first clock; the time scale of the second waveform is determined by the second clock. Such a cross-correlation procedure can be employed for waveforms for which a well-defined arrival time might not be readily or unambiguously determined (e.g., a multipeaked waveform or a waveform that is masked by noise in a time series but revealed via cross-correlation). Examples are disclosed in, e.g., U.S. Pat. No. 6,160,758, which is incorporated by reference in its entirety.

As noted above, numerous techniques exist in which multiple sensors deployed at multiple different locations receive signals. In some instances the signals can be all of the same general type (e.g., all sonic signals or all electromagnetic signals); in other instance the signals can be of different general types. A user can define what consists of a "general type" appropriate for the problem. For example, the user may consider all sonic signals (or all electromagnetic signals, or all seismic signals) as a type of interest. In other situations, a more specific (or less specific) type of signal can be considered "the same general type," e.g., sonic signals within a particular frequency band, or signals perceptible by a given brand of sensor, or signals exceeding a predefined intensity threshold.

Each sensor can be operationally coupled to a corresponding clock that records arrival times or time scales of signals at that sensor. Data pertaining to the signals, including the arrival times (e.g., for discrete signals) or time scales (e.g., for time-series or waveform signals), typically are transmitted to a central controller, computer, server, or processor (i.e., to a computerized machine) for analysis or processing; in many examples the arrival times or time scales of the signals are employed in that analysis or processing. Such a central controller, computer, server, or processor can be at a location remote from all of the sensors, or can be near one or more of the sensors or co-located with one of the sensors. In some examples the sensors can be sonic sensors (e.g., underwater sonar receivers or microphones) and the received signals can be sonic signals (e.g., sonar signals, underwater calls of marine or freshwater animals, or airborne calls of terrestrial animals). In some examples, the sensors can be seismic sensors recording sounds from seismic events, or vibrations transferred to the solid Earth from machines, vehicles, or other human or human-caused activity. In some examples the sensors can be electromagnetic sensors, and the received signals can be electromagnetic signals (e.g., UV, visible, or IR optical signals received by UV, visible, or IR optical sensors; radio-frequency, microwave, millimeter-wave, or terahertz signals received by radio-frequency, microwave, millimeter-wave, or terahertz sensors).

Differences in arrival times (referred to as time differences of arrival, or TDOAs) of a signal at various sensor locations can be employed to estimate the location of the source of that signal. The accuracy or validity of the estimated source location can be adversely affected by clock synchronization errors (CSEs) among the clocks coupled to the sensors. Without active or ongoing synchronization, a given pair of clocks often will exhibit relative drift that results in a CSE between them. In some circumstances, though, active or ongoing synchronization is not possible or practicable (e.g., for a set of remotely deployed sensors) or is too expensive (e.g., cost of a clock increases with its accuracy, and an atomic clock, which has much less propensity for CSE, can cost tens of thousands of dollars). In other circumstances, deployment or use of an active reference source for clock synchronization is too expensive or logistically problematic.

However, specially programmed equipment can exploit one or more TDOA measurements (i.e., one or more estimated uncorrected TDOAs) to provide one or more estimates of CSEs. Those estimated CSEs can in turn be employed in the analysis or processing of the sensor data to reduce or substantially eliminate adverse effects of the CSEs. This creates a process of utilizing measurements taken even when clock errors are suspected or known, via recording passively received signals (i.e., without needing any special signal transmission), and using such data to correct clock errors.

For a given pair of sensors 101 and 102 (FIG. 1) at corresponding estimated locations, minimum and estimated maximum true TDOAs between sensors 101 and 102 can be estimated using the sensor locations and signal propagation speed for the general type of signal of interest (e.g., speed of sound in water for underwater sonic signals received by multiple sonic sensors, speed of sound in air for airborne sonic signals received by multiple sonic sensors, the speed of light in air for atmospheric electromagnetic signals received by multiple electromagnetic sensors, or the propagation speed of seismic signals through the Earth). Those TDOAs are "true" in the sense that they are the TDOAs that would be obtained in the absence of any CSE between the first and second clocks and measurement error of any sort. The estimated minimum true TDOA (minTDOA) is the minimum true TDOA that can be obtained for an estimated maximum distance between the sensors 101 and 102 and for a signal source 103 at any position; the estimated maximum true TDOA (minTDOA) is the maximum true TDOA that can be obtained for an estimated maximum distance between the sensors 101 and 102 and for a signal source 103 at any position. In the simplest cases, the direct-path distance d between the sensors 101 and 102 is exactly known (distance along a straight line in unrestricted space or distance along a geodesic on a curved surface), the signal propagation speed c is exactly known, and the distance d and the speed c are constant; the quantities d and c are assumed to be positive. In those simplest cases, the minTDOA is exactly $-d/c$ and the maxTDOA is exactly $d/c$.

More generally, the sensor positions might not be known exactly but can only be estimated, or the propagation speed might not be known exactly but can only be estimated. If the signal propagation speed c is spatially homogeneous, then estimated distance d between the sensors and estimated signal propagation speed c (e.g., confidence intervals, probability distributions, etc.) can be combined in the simple geometric way described above to yield the corresponding estimated minTDOA and maxTDOA. In one specific example, the minTDOA can be defined as $-d_{max}/c_{min}$ and the maxTDOA can be defined as $d_{max}/c_{min}$, where $d_{max}$ is the estimated maximum distance between the sensors (linear or geodesic) and $c_{min}$ is the estimated minimum signal propagation speed.

For the preceding examples, the signal propagation speed is invariant with respect to signal pathway (even if not exactly known), so that simple geometry of the direct signal path (e.g., straight lines or curved geodesics) can be employed to estimate the minTDOA and the maxTDOA. If the signal propagation speed varies among different pathways (e.g., due to air or water currents, thermal gradients, thermoclines, or so forth), then the minTDOA and the maxTDOA can be estimated using so-called isodiachrons, as described in one or more of U.S. Pat. Nos. 7,219,032; 7,363,191; 8,010,314; 8,311,773; and 8,639,469, each of which is incorporated by reference in its entirety. Use of isodiachrons can yield estimated minTDOA and maxTDOA that differ from those estimated using the simple geometric approach.

Various examples and the discussion that follows treat both distance d between sensor locations and signal propagation speed c as if known exactly, so that minTDOA=$-d/c$ and maxTDOA=d/c. However, any of those examples and discussion can be generalized to utilize estimated inter-sensor distance, estimated signal propagation speed, path-dependent signal propagation speed, or isodiachrons. Such generalizations shall fall within the scope of the present disclosure or claims.

The estimated minTDOA and maxTDOA between first and second sensors 101 and 102 limits the range of TDOAs that can be exhibited by any signal received by those sensors. A first signal arrives at first and second sensors 101 and 102 at corresponding first and second uncorrected arrival times, which are determined by corresponding first and second clocks operatively coupled to the sensors 101 and 102. If there is no clock synchronization error (i.e., if CSE=0), the range of possible TDOAs between first and second sensors 101 and 102 that can occur without measurement error (assuming exact values for d, c, and the TDOA) is −d/c (i.e., the minTDOA) through d/c (i.e., the maxTDOA); if written in interval notation, the range is the closed interval [−d/c, d/c]. If there is no CSE, then: (i) a TDOA of −d/c indicates a later signal arrival time at second sensor 102, and a source located along an extension of the direct signal path connecting the sensor positions, not between the sensors, and closer to first sensor 101 than to second sensor 102; (ii) a TDOA of d/c indicates a later signal arrival time at first sensor 101, and a source located along the extension of the direct signal path, not between the sensors, and closer to second sensor 102; and (iii) all other source locations result in TDOAs within the open interval (−d/c, d/c). Note that those preceding statements can be generalized to cases wherein the TDOAs, sensor locations, or signal propagation speed are estimated rather than exactly known, or wherein the signal propagation speed varies with pathway; in such instances the intervals above (e.g., 100% confidence intervals) could be modified or replaced with, e.g., confidence intervals at other confidence levels, probability distributions, functions thereof, or the like, as described above, or −d/c could be replaced with the minTDOA and d/c could be replace with maxTDOA (taking into account uncertainties in d or c, or speed variations with pathway).

Now consider the case with a fixed (i.e., not time-varying), non-zero CSE between the first and second clocks. For the present disclosure and claims, a sign convention is chosen for the CSE wherein a positive CSE indicates that the second clock runs ahead of the first clock, so that simultaneous signal arrival at sensors 101 and 102 would result in a negative uncorrected TDOA for that signal. The opposite sign convention could have been equivalently employed or the designations of clocks as "first" and "second" could have been switched. Assuming the chosen sign convention, and also assuming known, exact values for d and c, and exact values for the measured uncorrected TDOAs, the uncorrected TDOAs for all signals arriving at first and second sensors 101 and 102 would fall within the closed interval [−CSE−d/c, −CSE+d/c] or, more generally, [−CSE+minTDOA, −CSE+maxTDOA]. If one or both of d or c are not known exactly but are estimated, if the measured TDOAs are not measured exactly but are estimated, or if the signal propagation speed varies among different propagation paths, then the simple interval can be replaced by a confidence interval, probability distribution, other statistical characterization, or functions thereof, in some instances employing isodiachronic concepts for estimating the minTDOA and the maxTDOA. Note that while closed intervals are used in various descriptions herein, open or half-open intervals could be used instead; use of any type of interval (i.e., open, half-open, or closed) falls within the scope of the present disclosure and appended claims.

This illustration indicates how a properly programmed, connected, and constructed system can employ uncorrected TDOAs to estimate an unknown CSE, even with no knowledge of any source locations. Such a system can compute data from a series of uncorrected TDOAs measured for signals emanating (or reflected) from multiple different sources at multiple corresponding unknown locations. For each measured uncorrected TDOA, a closed interval of possible CSE values that could have resulted in that TDOA is [−d/c−TDOA, d/c−TDOA] or, more generally, [minTDOA−TDOA, maxTDOA−TDOA].

Notably, even a single TDOA measurement provides some information limiting possible values of the unknown CSE; more measurements create further limits. Still assuming that the CSE is constant, then each of a series of measured TDOAs (e.g., $TDOA_1$, $TDOA_2$, $TDOA_N$, ...) produces a corresponding estimated CSE range ([−d/c−$TDOA_1$, d/c−$TDOA_1$], [−d/c−$TDOA_2$, d/c−$TDOA_2$], ..., [−d/c−$TDOA_N$, d/c−$TDOA_N$]). If the CSE does not change with time, the true CSE must satisfy all of those intervals simultaneously; an estimated cumulative CSE range can be calculated by combining two or more of the multiple estimated CSE ranges corresponding to the multiple measured TDOAs.

In the simple example wherein d, c, and measured TDOAs are known exactly, the estimated CSE ranges can be expressed as 100% confidence intervals, and the width of those intervals is exactly twice the exactly known signal propagation time d/c between sensors 101 and 102 (i.e., maxTDOA minus minTDOA). Those estimated CSE ranges can be combined to form the estimated cumulative CSE range by calculating the intersection (i.e., overlap) of all of them; that intersection forms a 100% confidence interval for the unknown, constant CSE, and it can be much narrower than any of the estimated CSE ranges individually.

It may not be necessary to combine all of the estimated CSE ranges from all measured uncorrected TDOAs to obtain the estimated cumulative CSE range. In the following example, wherein the CSE is unknown but constant with time and the uncorrected TDOAs are measured exactly, the same estimated cumulative CSE range that results from the calculation described above can be calculated by finding the intersection of only the two extreme estimated CSE ranges, i.e., the estimated CSE range having a corresponding uncorrected TDOA less than that of all other signals, and the estimated CSE range having a corresponding uncorrected TDOA greater than that of all other signals. The CSE range with the smallest set of values arises from the TDOA of a signal propagating toward both sensors 101 and 102 from a source lying closer to sensor 102 along the extended line connecting sensors 101 and 102 but outside of the interval between the sensors. The CSE range with the largest set of values arises from the TDOA of a signal propagating toward both sensors 101 and 102 from a source lying closer to sensor 101 along the extended line connecting sensors 101 and 102 but outside of the interval between the sensors. In this idealized case, the intersection of these two CSE ranges is a single number equal to the true CSE. TDOAs of signals propagating from sources at other locations restrict the range of possible CSE to a lesser degree. Again, those preceding statements can be generalized to cases wherein the sensor locations, signal propagation speed, or TDOAs are estimated rather than exactly known, or wherein the signal propagation speed varies with pathway; in such instances the 100% confidence intervals above could be replaced with, e.g., confidence intervals at other confidence levels, probability distributions, or the like, as described above.

In a simple specific example, assume d=1500 meters and c=1500 meters per second, so that d/c=1 second. A first measurement yields an uncorrected TDOA of 2 seconds, and the corresponding estimated CSE range is [−1−2, 1−2]=[−3, −1]. A second measurement yields an uncorrected TDOA of 0 seconds, and the corresponding estimated CSE range is [−1−0, 1−0]=[−1, 1]. If the CSE has not changed, then the true CSE satisfies both estimated CSE ranges, so the true CSE is −1 second, i.e., the only point shared by the two estimated CSE ranges. Note that this estimate is obtained without any knowledge of the locations of the signal sources. However, one can infer in this particular example that both sources must lie along the extended line joining the sensors, but not between them. The corresponding measured TDOAs are the extreme values described above.

In a second simple specific example using the same values of d and c, uncorrected TDOAs of −1 seconds and −0.25 seconds are measured. The first estimated CSE range is [−1−(−1), (1−(−1)]=[0, 2], and the second estimated CSE range is [−1−(−0.25), 1−(−0.25)]=[−0.75, 1.25]. If the CSE has not changed, then the true CSE lies within the estimated cumulative CSE range [0, 1.25], i.e., the overlap of the two estimated CSE ranges. The true CSE is not uniquely determined, but the second measured uncorrected TDOA narrows the range of possible CSE. In the absence of any prior knowledge of the CSE, even one uncorrected TDOA measurement narrows the range of possible CSE to [0, 2]. A second uncorrected TDOA measurement can narrow that range further, and additional uncorrected TDOA measurements can narrow the CSE range still further.

Combining intervals can be calculated by finding intersections or overlaps, assigning probability distributions to values in each interval and computing a probability of overlap, or forming other functions of these intervals to compute the estimated CSE range.

As more uncorrected TDOAs are measured from multiple sources at multiple corresponding unknown source locations (e.g., sources 103 randomly or otherwise distributed in the space surrounding sensors 101 and 102 in FIG. 1), those uncorrected TDOAs "sweep out" the range of all possible uncorrected TDOAs that could have resulted from the initially unknown (and constant) CSE. That in turn progressively narrows the range of possible CSEs that could have produced those measured uncorrected TDOAs.

That progression is illustrated in the simulated example of FIGS. 2A through 2D, which shows upper and lower bounds for the estimated cumulative CSE range converging toward each other as more uncorrected TDOAs are measured from signals from sources 103 arriving at sensors 101 and 102. In the simulation, sensors 101 and 102 are 1000 meters apart (i.e., d=1000 meters) and the sensors are underwater sonic sensors. The signal propagation speed is set at 1500 meters per second (i.e., c=1500 meters per second, typical of oceanic acoustic propagation). Accordingly, the propagation time between sensors 101 and 102 is calculated at about 0.6667 seconds. Measurement uncertainty for the measured uncorrected TDOAs can be expressed as ranges. The simulated CSE is −20 seconds and remains constant in the simulation of FIGS. 2A-2D. One signal arrives at sensors 101 and 102 from each source 103; signals arrive every 1000 seconds until each source has provided one signal.

Figure 2A:
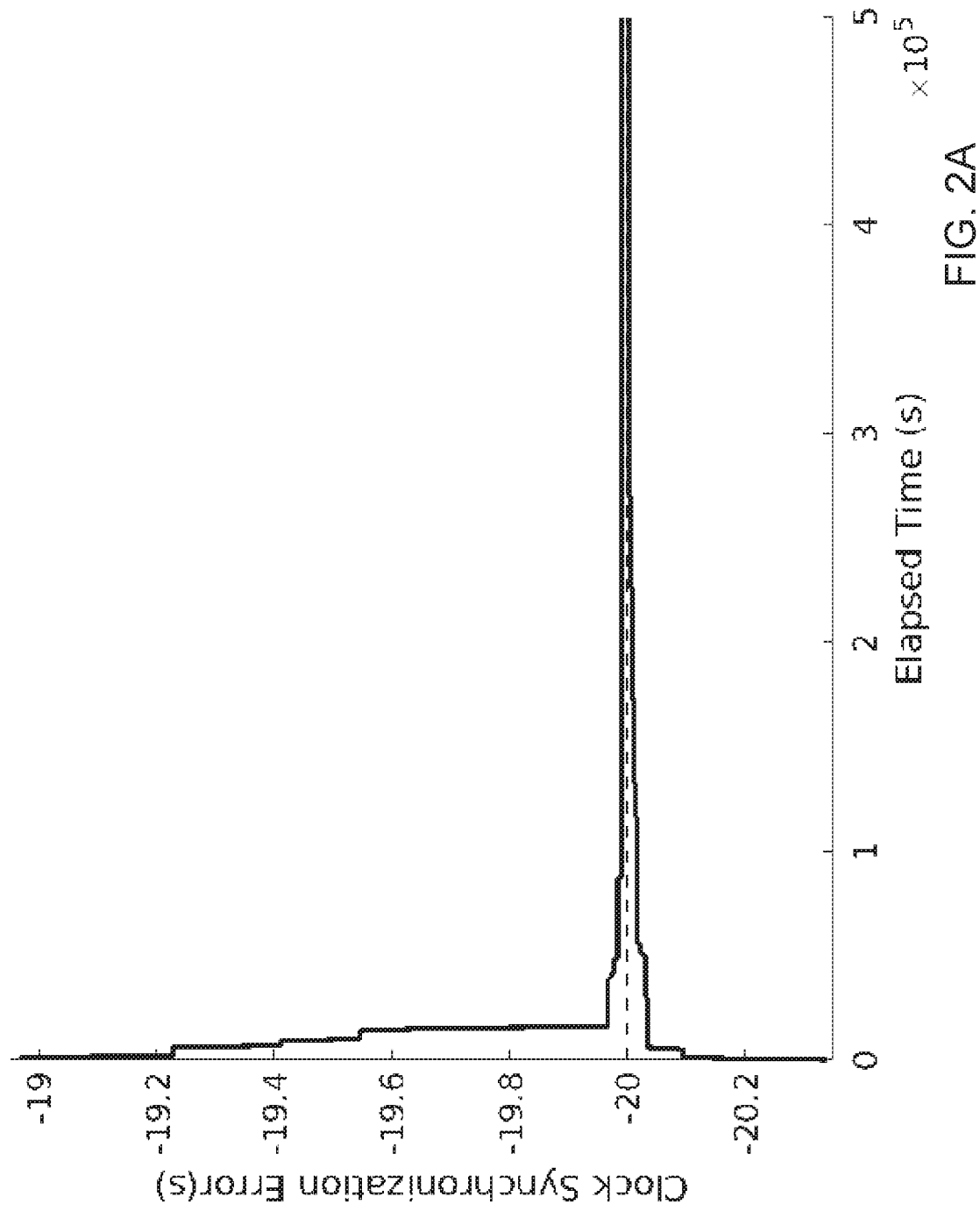
Figure 2B:
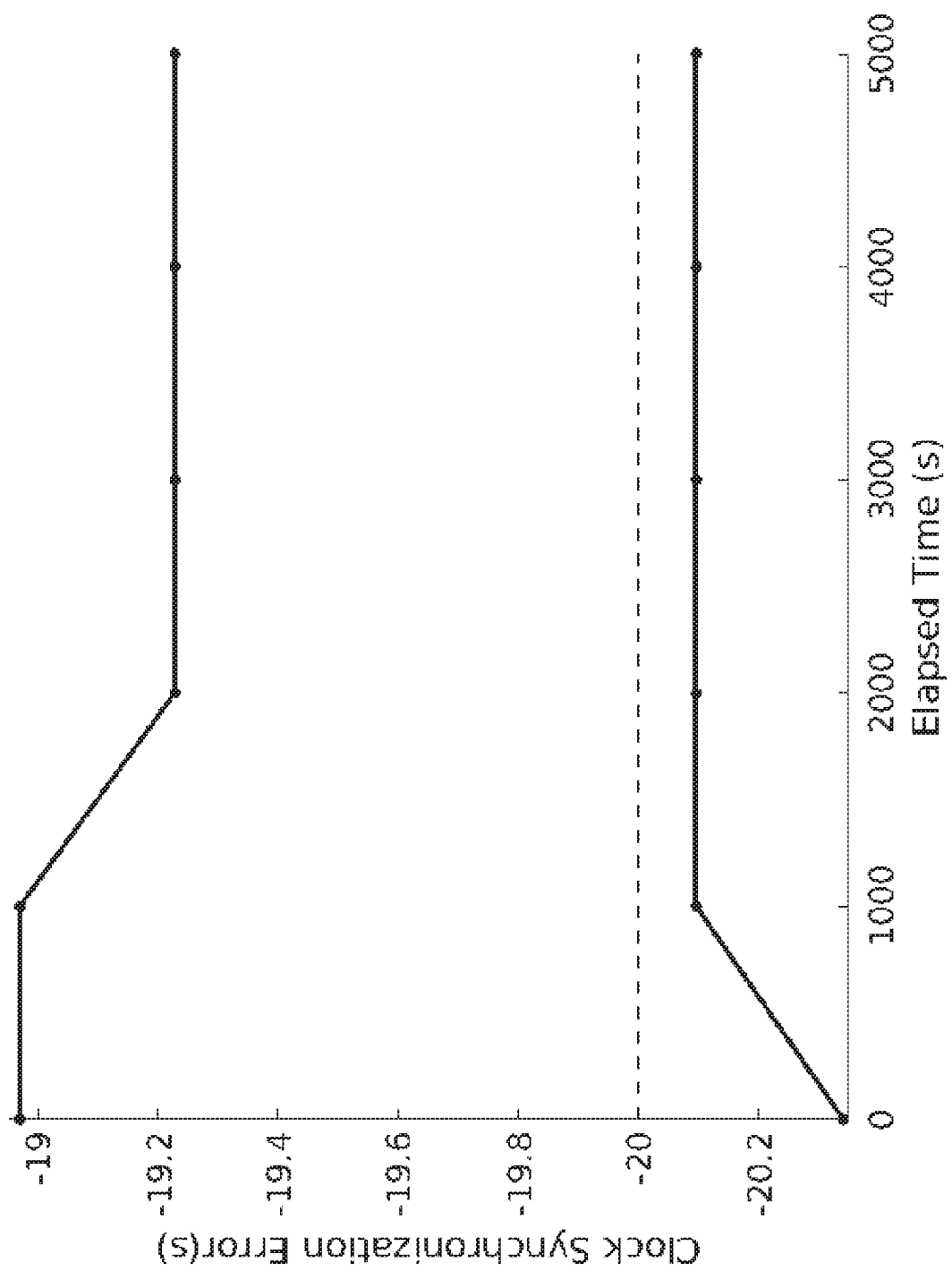
Figure 2D:
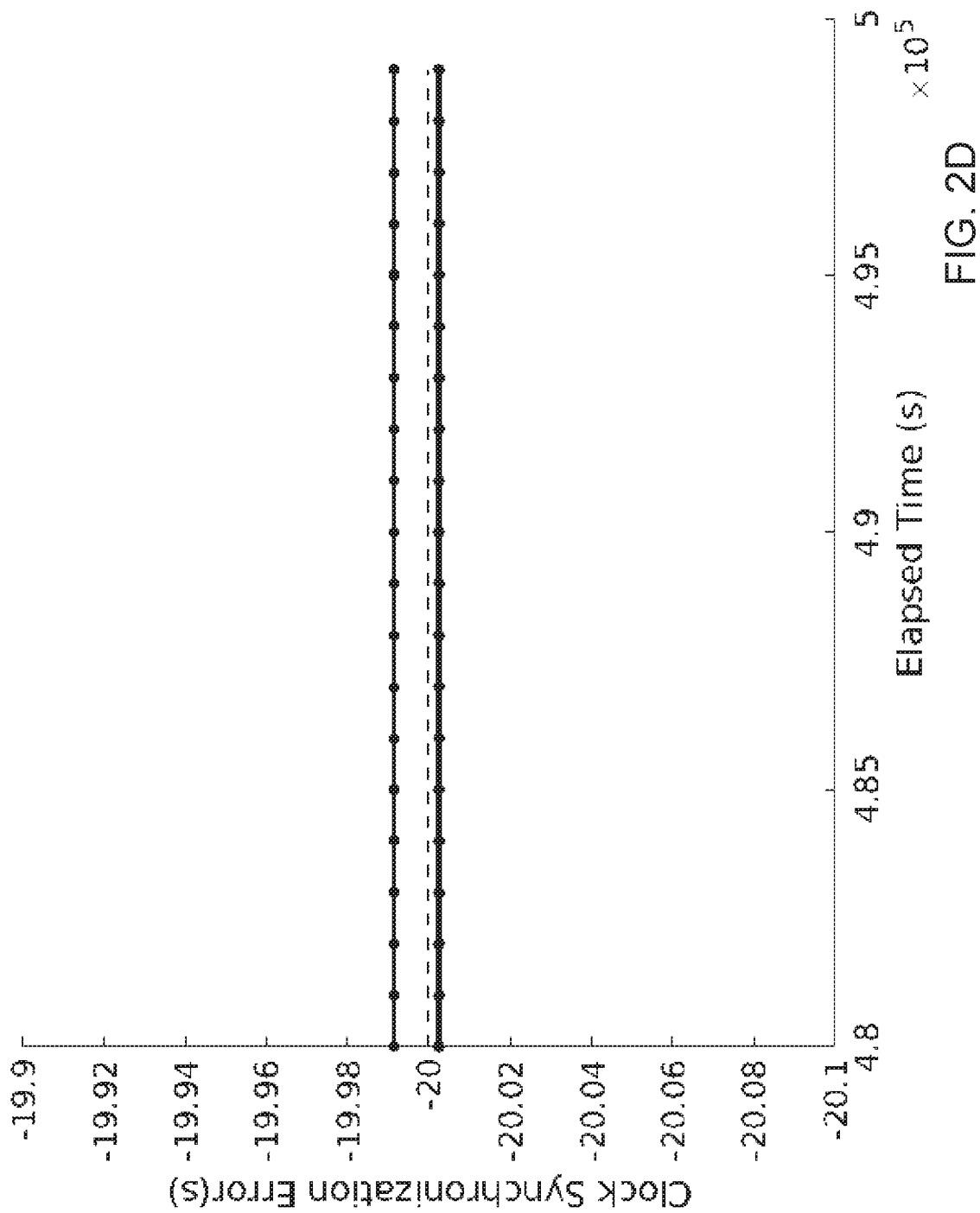

FIGS. 2A and 2B show the progression as additional estimated CSE ranges are combined in the forward direction. FIGS. 2C and 2D show the progression as those estimated CSE ranges are combined in the reverse direction, bounded by the estimated CSE ranges calculated in the forward direction. The first uncorrected TDOA of the simulation (at 0 seconds) is within the range [19.6368, 19.6741], yielding a first estimated CSE range of [−20.3408, −18.9701]. The second uncorrected TDOA of the simulation (at 1000 seconds) is within the range [19.3954, 19.4294], yielding a second estimated CSE range of [−20.0960, −18.7288]. The estimated cumulative CSE range after those two uncorrected TDOAs is the intersection of the first two estimated CSE ranges, or [−20.0960, −18.9701]. The third uncorrected TDOA of the simulation (at 2000 seconds) is within the range [19.8945, 19.9036], yielding a third estimated CSE range of [−20.5703, −19.2278]. The estimated cumulative CSE range after three uncorrected TDOAs is [−20.0960, −19.2278] (i.e., the intersection of the first three estimated CSE ranges). Each additional uncorrected TDOA can potentially reduce further the width of the estimated cumulative CSE range; some do not. Each step-like feature of the lower curve of FIGS. 2A and 2B represents an uncorrected TDOA that further restricts the cumulative CSE range; intervening relatively flat portions correspond to uncorrected TDOAs that fail to restrict further the cumulative CSE range. As more estimated CSE ranges are added, the estimated cumulative CSE range gets generally narrower, yielding a progressively more accurate estimate of the CSE.

Uncorrected TDOA measurements that arise from sources that happen to be located near the line connecting sources 101 and 102 are most effective for narrowing the estimated cumulative CSE range and result in the steps that are evident in the plots of FIGS. 2A and 2B. Some uncorrected TDOA measurements do not yield further narrowing of the estimated cumulative CSE range, resulting in the flat portions of the plot of FIGS. 2A and 2B. The estimated cumulative CSE range settles at [−20.0025, −19.9914]. Note that the true CSE has been estimated to within about ±0.0056 seconds without any knowledge of the locations of any of the sources. Running the calculation in the reverse direction further narrows the estimated cumulative CSE range, most noticeably near the start of elapsed time when the estimated CSE ranges from the forward calculation are wider. The calculation is computationally quite fast, taking only about a second or less to run on a standard desktop computer. Other techniques that rely on estimated of source locations or cross-correlations of signals over long time periods can take hours or even days of computer time.

Figure 3A:
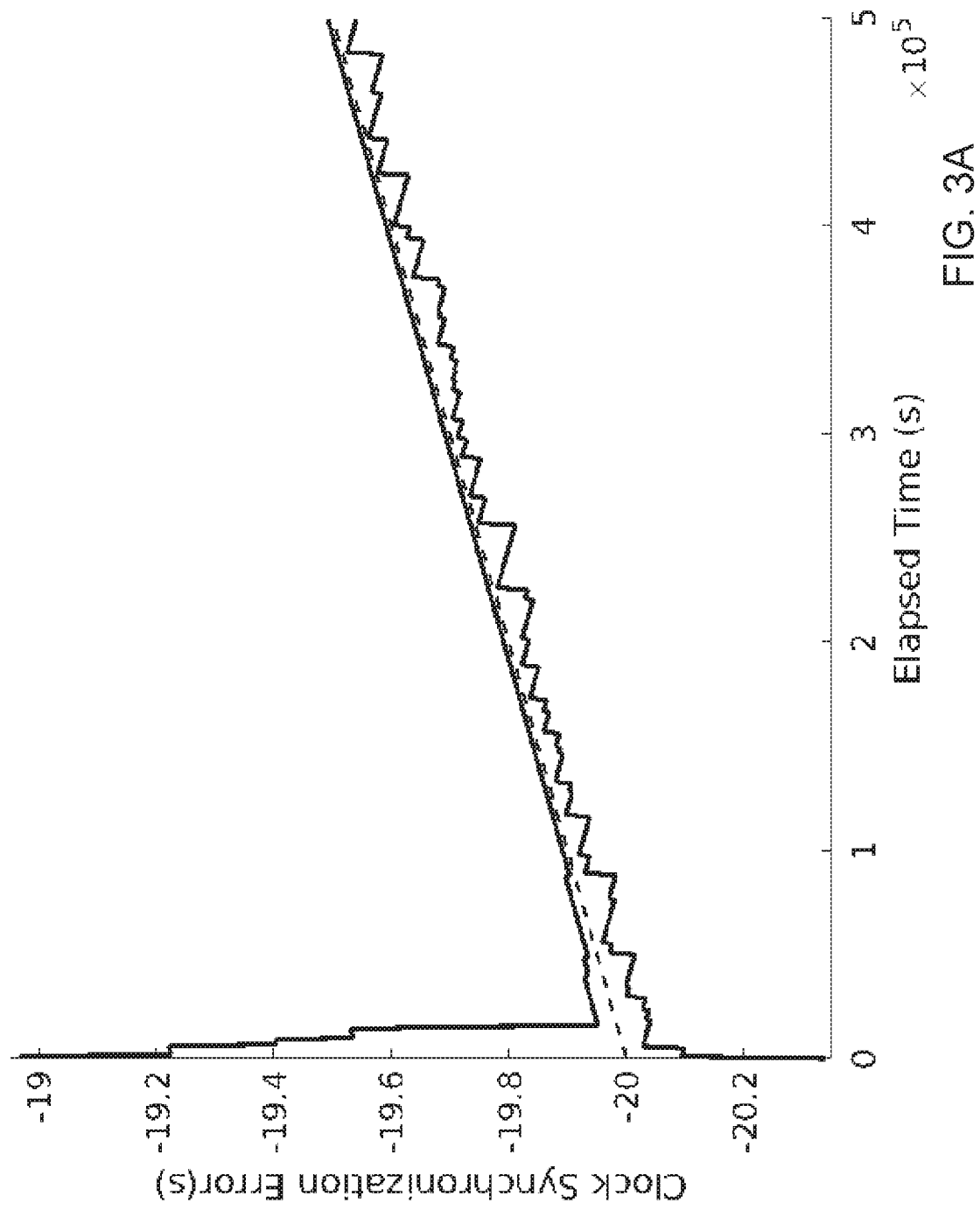
FIGS. 3A through 3D are graphs showing the evolution of an estimated cumulative CSE range as additional estimated CSE ranges are combined, with the estimated CSE ranges arising from simulated signals propagating from the sources of FIG. 1 and arriving at the sensors of FIG. 1. The true CSE between the clocks drifts in the positive direction at a rate of $10^{-6}$ in this simulation and is indicated by the dashed lines.
Figure 3B:
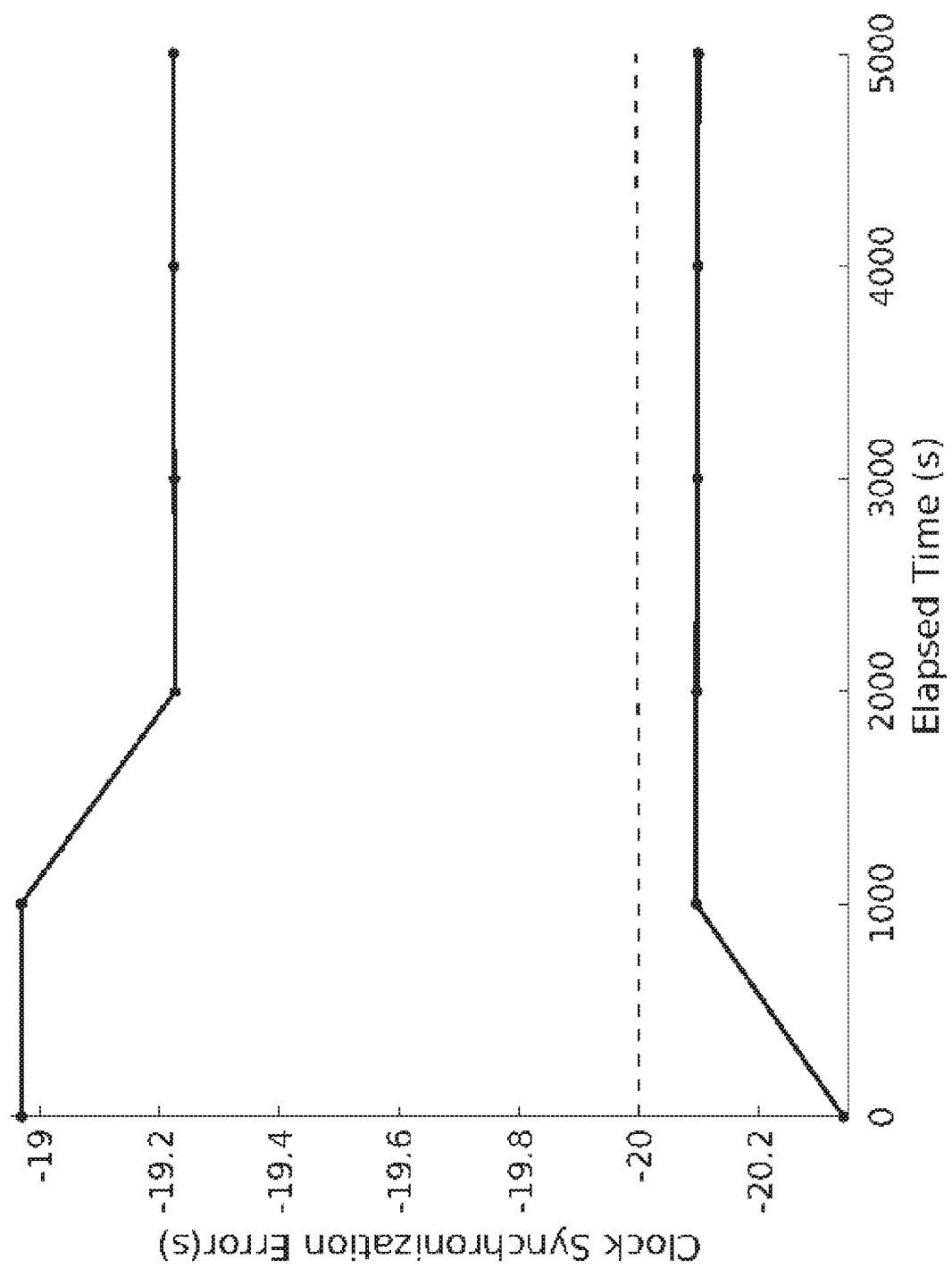
Figure 3C:
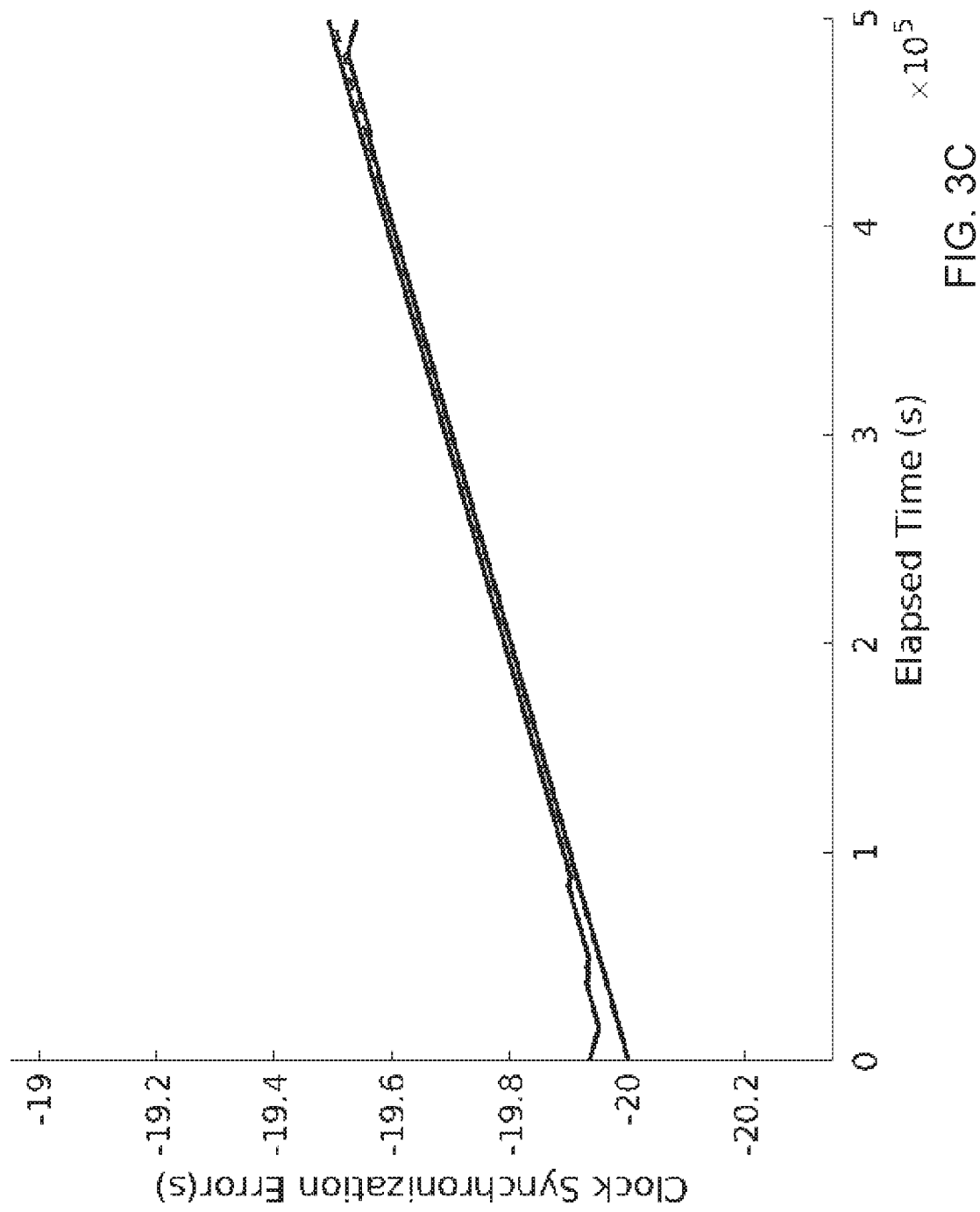
Figure 3D:
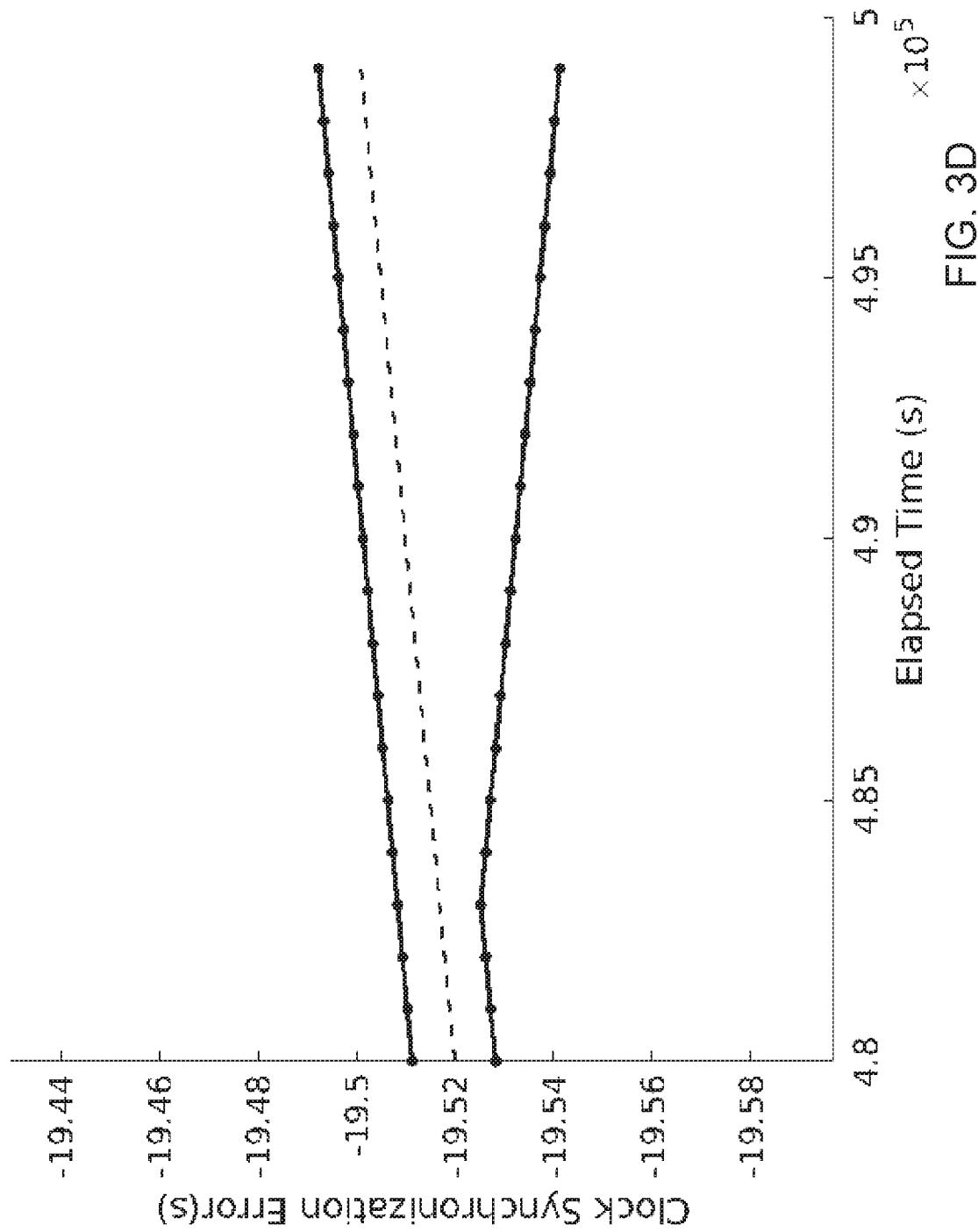

In the simulation results shown in FIGS. 3A-3D, the same conditions apply except that the CSE varies with time, starting at −20 seconds and varying at a rate of 1 part in $10^6$ (e.g., after $5 \times 10^5$ seconds (a little less than six days), the CSE would have drifted by about 0.5 seconds). FIGS. 3A and 3B show the progression as additional estimated CSE ranges are combined in the forward direction. FIGS. 3C and 3D show the progression as those estimated CSE ranges are combined in the reverse direction, bounded by the estimated CSE ranges calculated in the forward direction. The first measured uncorrected TDOA range and its corresponding estimated CSE range is the same as the previous simulation. The second and third are shifted 0.001 seconds and 0.002 second later, respectively, due to the CSE drift of 1 part in $10^6$. To account for the CSE drift, at each step the estimated cumulative CSE range is expanded according to the estimated maximum CSE drift, assumed in this example to be 1 part in $10^6$, before being combined (e.g., overlapped or intersected) with the next estimated CSE range. The first estimated CSE range (at 0 seconds) is [−20.3408, −19.9701]. That range is allowed to expand to [−20.3418, −18.9691]

over 1000 seconds, and it is that expanded range that is overlapped with the second estimated CSE range to yield the second cumulative CSE range of [−20,0950, −18,9691]. That range expands to [−20,0960, −18,9681] over the next 1000 seconds before combining with the third estimated CSE range to yield the third estimated cumulative CSE range of [−20,0960, −19,2258]. The process is repeated over the time period during which signals are received by the sensors 101 and 102.

Each additional uncorrected TDOA can potentially reduce further the width of the estimated cumulative CSE range; some do not. Meanwhile, the cumulative CSE range expands according to the estimated maximum CSE drift rate, until constrained by an estimated CSE range that results in further narrowing. Each step-like feature of the lower curve of FIGS. 3A and 3B represents an uncorrected TDOA that further restricts the cumulative CSE range; intervening nearly flat portions (but somewhat sloped due to the range expansion) correspond to uncorrected TDOAs that fail to restrict further the cumulative CSE range. As more estimated CSE ranges are added, the estimated cumulative CSE range gets generally narrower, yielding a progressively more accurate estimate of the CSE.

FIGS. 3C and 3D show the result of running the calculation of estimated cumulative CSE range in the reverse direction, using the ranges calculated in the forward direction as constraints on the estimated cumulative CSE range. The calculated curves stay within about ±0.01 seconds of the true CSE, even without knowing any locations of the sources 103.

In the preceding example, the estimated cumulative CSE range was expanded symmetrically and linearly with elapsed time. Symmetric expansion can be appropriate in examples wherein there is no prior knowledge of the direction of the CSE drift. If the direction (positive or negative) of the CSE drift is estimated or known, or if it is known that the possible magnitude of the drift is greater in one direction than the other, then in some examples asymmetric expansion can be advantageously employed. In the preceding example the estimated CSE interval was expanded linearly with respect to elapsed time. Any suitable time-dependent expansion can be employed, e.g., linear, quadratic, and so forth.

A method is implemented using a programmed computerized machine and includes using an estimated uncorrected time-difference-of-arrival (TDOA) for a first signal at first and second sensors 101 and 102 to calculate a first estimated clock synchronization error (CSE) range. The first sensor 101 is located at a corresponding estimated first sensor location and is operatively coupled to a first clock; the second sensor 102 is located at a corresponding estimated second sensor location and is operatively coupled to a second clock. The location of a source 103 of the first signal need not be known. In some examples the estimated uncorrected TDOAs can be calculated from signals received from the sensors 101 and 102 (in any suitable way, e.g., subtracting estimated arrival times or cross-correlating signals). In some examples the uncorrected TDOAs can be previously measured or calculated and are received at (e.g., via a computer network or via acoustic or electromagnetic wireless transmitters and receivers) or retrieved (e.g., from a local or remote digital storage medium) by the computer for use in calculating the estimated CSE range or the estimated cumulative CSE range.

A positive value for the CSE means the second clock is ahead of the first clock; a negative value for the CSE means the second clock is behind the first clock. The first estimated CSE range between the first clock and the second clock extends (i) from a minTDOA, for the same general signal type as the first signal, between the first estimated sensor location and the second estimated sensor location, minus an estimated maximum uncorrected TDOA (e.g., $-d/c$−TDOA in the simplest example), (ii) to a maxTDOA, for the same general signal type as the first signal, between the first estimated sensor location and the second estimated sensor location minus an estimated minimum uncorrected TDOA (e.g., $d/c$−TDOA in the simplest example).

An uncorrected TDOA is positive when the first signal appears to arrive later at the first sensor 101 as measured by the first and second clocks with whatever CSE might be present. A positive CSE indicates that the second clock runs ahead of the first clock, i.e., at any given time the second clock registers a time later than the first clock. The first estimated CSE range can be used to perform a further computerized calculation, e.g., detecting, processing, filtering, isolating, identifying, classifying, source-separating, or source-locating, with respect to one or more time-dependent signals arriving at the first sensor 101 or the second sensor 102. Instead or in addition, the first estimated CSE range can be used to adjust one or both of the first or second clocks to compensate at least partly for a CSE within the first estimated CSE range. That compensation can be performed in any suitable way, including, e.g., by changing the clock's time, or by modifying temporal data from the clock (before storage, or upon use in a calculation) according to the estimated first, additional, or cumulative CSE intervals.

The method can further include determining an estimated uncorrected time-difference-of-arrival (TDOA) at the sensors 101 and 102 for each additional signal propagating from a corresponding source 103. A corresponding additional initial estimated CSE range is calculated in the same way described above: the Nth estimated CSE range between the first clock and the second clock extends (i) from a minTDOA, for the same general signal type as the corresponding additional signal, between the first estimated sensor location and the second estimated sensor location, minus a corresponding estimated maximum uncorrected TDOA determined for the Nth signal (e.g., $-d/c$−$TDOA_N$ in the simplest example), (ii) to a maxTDOA, for the same general signal type as the corresponding additional signal, between the first estimated sensor location and the second estimated sensor location minus a corresponding estimated minimum uncorrected TDOA determined for the Nth signal (e.g., $d/c$−$TDOA_N$ in the simplest example).

An estimated cumulative CSE range between the first clock and the second clock can be calculated as a combination of two or more among the first estimated CSE range and the additional estimated CSE ranges. The estimated cumulative CSE range can be used to perform a further computerized calculation, e.g., detecting, processing, filtering, isolating, identifying, classifying, source-separating, or source-locating, with respect to one or more time-dependent signals arriving at the first sensor 101 or the second sensor 102. Instead or in addition, the estimated cumulative CSE range can be used to adjust, in any suitable way, one or both of the first or second clocks to compensate at least partly for a CSE within the first estimated CSE range. Any suitable combination of the estimated CSE ranges can be employed (including those noted above), and which type of combination is employed can depend on the nature of the estimated CSE ranges. In some examples only one estimated CSE range can be used; in some examples two or more but not all estimated CSE ranges can be used; in some examples all of the estimated CSE ranges can be used.

In the simple case wherein the signal propagation time between the sensors 101 and 102 is exactly known, the initial widths of the first or additional estimated CSE ranges are equal to twice the signal propagation time between sensors 101 and 102 (i.e., maxTDOA minus minTDOA equals 2d/c). In instances wherein the signal propagation time is estimated (e.g., due to one or more of estimated sensor positions, estimated signal propagation speed, or multiple signal propagation paths), the initial width of the first estimated CSE range is related to and varies directly with the estimated propagation time, but it is not necessarily (and typically is not) equal to exactly twice the propagation time. "About twice the estimated signal propagation time" would take into account the uncertainties of the distance d between sensors 101 and 102 and the signal propagation speed c, or the variation of signal propagation speed with signal pathway via use of isodiachrons, to account for the estimated difference between TDOAs of signals arriving at sensors 101 and 102 from opposite directions along the line connecting sensors 101 and 102.

In some examples suitable for dealing with potentially drifting clocks, the estimated cumulative CSE range resulting from each measured uncorrected TDOA can be evolved with respect to elapsed time forward or backward (e.g., expanded, contracted, or shifted). In examples wherein successive uncorrected TDOAs are processed in a forward direction, an expanding estimated cumulative CSE range is combined (e.g., overlapped or intersected) with each successive estimated CSE range calculated from each later additional signal received at the sensors 101 and 102. In examples wherein successive uncorrected TDOAs are processed in a reverse direction, an expanding estimated cumulative CSE range is combined (e.g., overlapped or intersected) with each successive estimated CSE range calculated from each earlier additional signal received at the sensors 101 and 102. In some examples, the width of the estimated cumulative CSE range can be expanded linearly and symmetrically with respect to forward or reverse time elapsed during arrival of signals at first and second sensors 101 and 102, with the linear rate of expansion being about equal to an estimated maximum relative drift rate of the clocks. In other examples, the estimated CSE range expansion with respect to forward or reverse elapsed time can be asymmetric, nonlinear, or both. Expansion may be desirable in examples wherein uncertainty of the CSE increases during the time interval between arrival times of signals from two sources at the sensors. In other examples, the estimated CSE range can be contracted; the contraction can be symmetric or asymmetric, and can be linear or nonlinear with respect to elapsed time.

For example, in the simulation results depicted in FIGS. 3A-3D, the initial CSE is −20 seconds and the relative drift rate between the clocks is 1 part in $10^6$. The estimated cumulative CSE range is expanded linearly and symmetrically at a rate of plus or minus $10^{-6}$ for the upper and lower estimated CSE range bounds, respectively, while intermittently shrinking when combined with an estimated CSE range that results in narrowing. Note that the relatively flat step-like features of the lower plot of FIGS. 3A and 3B are in fact slightly negatively sloped, indicative of the corresponding CSE ranges expanding with elapsed time. The upper curve does not exhibit that step-like behavior because the underlying drift of the CSE is in that upward direction. The estimated cumulative CSE ranges calculated in the reverse direction are much narrower because they include information from the relatively narrow CSE interval from the end of the forward calculation that is propagated backwards in time.

In some examples, the estimated CSE ranges or the estimated cumulative CSE range can be employed to screen out bad data or incorrect assumptions. In some examples, an estimated uncorrected TDOA can be excluded if its corresponding estimated CSE range is incompatible with the estimated cumulative CSE range calculated based on one or more other estimated TDOAs. In some examples, if the estimated CSE drift rate is incorrect (used for expanding the estimated CSEs with elapsed time), some or many estimated CSE ranges might be inconsistent with others. Such inconsistency can be used to adjust the assumed CSE drift rate to, e.g., a larger magnitude. In some examples, inconsistencies among multiple estimated CSE ranges can indicate an inaccurate estimate of the propagation time between the sensors 101 and 102, due to, e.g., inaccurate estimates of sensor positions, signal propagation speed, or other conditions, or even errors in a computer program used to carry out the calculations.

In some examples, the estimated minTDOA and maxTDOA between the first and second sensors can be calculated using a spatially homogeneous signal propagation speed. In such examples the difference between the maxTDOA and the minTDOA is equal to 2d/c when the distance and speed are exactly known. In other such examples the propagation time can be treated as a range, confidence interval, probability distribution, or the like, when there are uncertainties in the signal propagation speed or distance between sensors 101 and 102. In some examples, the estimated minTDOA and maxTDOA between the first and second sensors can be calculated using a spatially inhomogeneous signal propagation speed and using isodiachrons (discussed above and in the incorporated references).

The discussion thus far has focused on estimating relative CSE between two clocks. The disclosed methods can be generalized to three or more clocks, calculating N−1 estimated cumulative CSE ranges for each of N−1 pairs of clocks among N clocks. Any suitable pairing scheme can be employed, e.g., choosing one "master" clock and calculating an estimated cumulative CSE range between that clock and each of the others (1 & 2, 1 & 3, 1 & 4, . . . , 1 & N), calculating an estimated cumulative CSE range for sequenced pairs (1 & 2, 2 & 3, 3 & 4, . . . , N−1 & N), using some other suitable sequence, or using some other pairing scheme (e.g., random pairing or pairing based on signal arrival times).

Having estimated the CSE between the clocks, that estimate can be put to use in a variety of ways. Although not necessary, in some examples the estimated cumulative CSE can be used to recalibrate or reset or otherwise adjust the clock. The first estimated CSE range or a cumulative estimated CSE range can be used to adjust the first or second clock by corresponding amounts that compensate for a CSE that falls within the first or estimated cumulative CSE range. In some examples, one or both clocks can be adjusted directly, e.g., by altering a gear speed, or by altering a mechanical or electrical oscillator frequency, or simply applying a discrete shift of the clock's time. In some examples, one or both clocks can be adjusted indirectly, by adjusting temporal data from the clocks, e.g., before storage or only upon use in a subsequent calculation or analysis.

The estimated the CSE between the clocks can be put to use in a variety of ways to improve operation of programmed machines that process sensor signals or sensor data, and perform computerized calculations thereon. In some examples, the first estimated CSE range or a cumulative estimated CSE range can be used to calculate one or more corresponding estimated corrected TDOAs for the first signal or one or more additional signals at the first or second sensors. Those corrected TDOAs can then be used in subsequent calculations, analysis, or modeling. For example, arrival times of animal calls can be corrected using the corresponding estimated cumulative CSE ranges before using the corresponding estimated corrected TDOAs to estimate the location of the animal. In some examples, the corrected TDOAs can be employed in estimation of locations or numbers of signal sources 103. Any suitable method can be employed, such a sequential bound estimation (SBE), matched-filed processing, or other suitable technique. In another example, relative time bases from the two sensors can be corrected to account for the estimated CSE ranges, making it easier to detect with one sensor a signal seen on another sensor.

In some examples, it is desired to process signals from sensors over a time window that includes a portion of the signal that is of interest. Such signal-processing can include analyzing, filtering, auto- or cross-correlating, etc. If the CSE is unknown, a larger time window can be processed to improve odds of inclusion of the portion of interest. However, many processing techniques are slow or computationally intensive; hence processing large amounts of ultimately uninteresting or irrelevant signals is undesirable. Using an estimated CSE range, a temporal window can be limited over which certain received signal waveforms from the first and second sensors are further processed. Signal processing over a temporal window thus limited can be applied (i) to identify a given signal arriving at the both sensors 101 and 102, (ii) to classify a given signal from one sensor (e.g., sensor 102) based on classification of that signal from the other sensor (e.g., sensor 101), or (iii) to isolate a given signal from multiple other signals arriving at the sensors 101 and 102.

In some examples a corrected TDOA can be used to filter out bad or invalid signals or data. A given signal can be excluded from further processing or analysis if its arrival at the sensors 101 and 102 would result in an estimated uncorrected TDOA that is incompatible with the first estimated CSE range or an estimated cumulative CSE range.

Significantly, the estimated cumulative CSE ranges can be used to correct the TDOAs (or adjust the clocks) of the very same signals that were used to calculate those cumulative CSE ranges; no separate collection of "correction data" is needed. The uncorrected TDOAs of those signals can be employed to self-correct their own TDOAs, without knowledge of source locations, without using active sources, and without computationally intensive methods. Nor do the corrections need to be made contemporaneously with the arrival of the signals at the sensors, or upon their reception or retrieval; they can be applied retroactively during later analysis or processing of the signal data. Any calculation or estimation based on the corrected TDOAs of those signals can improve accuracy or reliability of the processed sensor signals or sensor data, for example to generate improved location estimates.

The systems and methods disclosed herein, implemented using a "programmed computerized machine," can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in tangible, non-transient, temporary or permanent storage or replaceable media, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future computer-readable storage alternatives. Electronic indicia of a dataset can be read from, received from, or stored on any of the tangible, non-transitory computer-readable media mentioned herein.

In addition to the preceding, the following examples fall within the scope of the present disclosure or appended claims:

Example 1. A method implemented using a programmed computerized machine, the method comprising: (a) receiving, retrieving, or calculating an estimated uncorrected time-difference-of-arrival (TDOA) for a first signal arriving (i) at a first sensor at an estimated first sensor location and (ii) at a second sensor at an estimated second sensor location, the first sensor being operatively coupled to a first clock and the second sensor being operatively coupled to a second clock; (b) calculating a first estimated clock synchronization error (CSE) range between the first clock and the second clock, said range extending (i) from an estimated minimum true TDOA (minTDOA), for the same general signal type as the first signal, between the first estimated sensor location and the second estimated sensor location, minus an estimated maximum uncorrected TDOA for the first signal, (ii) to an estimated maximum true TDOA (maxTDOA), for the same general signal type as the first signal, between the first estimated sensor location and the second estimated sensor location minus an estimated minimum uncorrected TDOA for the first signal; and (c) using the first estimated CSE range (i) to perform a computerized calculation with respect to one or more time-dependent signals arriving at the first sensor or the second sensor, or (ii) to adjust one or both of the first or second clocks to compensate at least partly for a CSE within the first estimated CSE range.

Example 2. The method of Example 1 wherein the computerized calculation uses the first estimated CSE range for detecting, processing, filtering, isolating, identifying, classifying, source-separating, or source-locating one or more time-dependent signals arriving at the first sensor or the second sensor.

Example 3. The method of any one of Examples 1 or 2 further comprising: (d) receiving, retrieving, or calculating an estimated uncorrected time-difference-of-arrival (TDOA) for one or more subsequent additional signals at the first sensor and at the second sensor; (e) calculating one or more corresponding additional estimated clock synchronization error (CSE) ranges between the first clock and the second clock, each range extending (i) from a minTDOA, for the same general signal type as the corresponding additional signal, between the first estimated sensor location and the second estimated sensor location, minus a corresponding estimated maximum uncorrected TDOA for the corresponding additional signal, (d), (ii) to a maxTDOA, for the same general signal type as the corresponding additional signal, between the first estimated sensor location and the second estimated sensor location minus a corresponding estimated minimum uncorrected TDOA for the corresponding additional signal; (f) calculating an estimated cumulative CSE range between the first clock and the second clock as a combination of two or more among the first estimated CSE range and the additional estimated CSE ranges; and (g) using the estimated cumulative CSE range (i) to perform a computerized calculation with respect to one or more time-dependent signals arriving at the first sensor or the second sensor, or (ii) to adjust one or both of the first or second clocks to compensate at least partly for a CSE within the estimated cumulative CSE range.

Example 4. The method of Example 3 wherein the computerized calculation uses the estimated cumulative CSE range for detecting, processing, filtering, isolating, identifying, classifying, source-separating, or source-locating one or more time-dependent signals arriving at the first sensor or the second sensor.

Example 5. The method of any one of Examples 1 through 4 further comprising, using the first estimated CSE range or a cumulative estimated CSE range, calculating one or more corresponding estimated corrected TDOAs for the first signal or one or more additional signals at the first sensor or the second sensor.

Example 6. The method of Example 5 further comprising estimating a corresponding source location for the first signal or for one or more additional signals by sequential bound estimation, matched-field processing, matching of corrected TDOAs with a model for TDOAs as a function of location, a Bayesian technique, or other suitable technique, using one or more estimated corrected TDOAs.

Example 7. The method of any one of Examples 1 through 6 further comprising, using the first estimated CSE range or a cumulative estimated CSE range, limiting a temporal window over which certain received signal waveforms from the first sensor or the second sensor are further processed, filtered, auto- or cross-correlated, or analyzed.

Example 8. The method of Example 7 wherein the limited temporal window is applied to identify a given signal arriving at the both first and second sensors, to detect or classify a given signal from one sensor based on detection or classification of that signal from the other sensor, or to isolate a given signal from multiple other signals arriving at the sensors.

Example 9. The method of any one of Examples 1 through 8 further comprising excluding from further processing or analysis a given signal arriving at the first sensor and the second sensor that results in an estimated uncorrected TDOA that is incompatible with the first estimated CSE range or an estimated cumulative CSE range.

Example 10. The method of any one of Examples 1 through 9 further comprising calculating the minTDOA and the maxTDOA between the first and second sensors using a spatially homogeneous signal propagation speed.

Example 11. The method of any one of Examples 1 through 9 further comprising calculating the minTDOA and the maxTDOA between the first and second sensors using a spatially inhomogeneous signal propagation speed.

Example 12. The method of any one of Examples 1 through 11 wherein determining an estimated uncorrected TDOA for a given one of the first signal or additional signals at the first sensor and at the second sensor comprises estimating a difference between (i) a corresponding first uncorrected estimated arrival time of the given one of the signals at the first sensor and (ii) a corresponding second uncorrected estimated arrival time of the given one of the signals at the second sensor, the first uncorrected estimated arrival time being determined by the first clock and the second uncorrected estimated arrival time being determined by the second clock.

Example 13. The method of any one of Examples 1 through 12 wherein determining an estimated uncorrected TDOA for a given one of the first signal or additional signals at the first sensor and at the second sensor comprises calculating a cross-correlation of corresponding first and second uncorrected waveforms produced by the given one of the signals at the first and second sensors, respectively, a time scale for the first waveform being determined by the first clock and a time scale of the second waveform being determined by the second clock.

Example 14. The method of any one of Examples 3 through 13 further comprising evolving, with respect to time elapsed before or after arrival of the corresponding signal at the first sensor and the second sensor, one or more of the first estimated CSE range, the additional estimated CSE ranges, or the estimated cumulative CSE range.

Example 15. The method of Example 14 wherein evolving one or more of the first estimated CSE range, the additional estimated CSE ranges, or the estimated cumulative CSE range includes expanding one or more of the first estimated CSE range, the additional estimated CSE ranges, or the estimated cumulative CSE range.

Example 16. The method of any one of Examples 14 or 15 wherein evolving one or more of the first estimated CSE range, the additional estimated CSE ranges, or the estimated cumulative CSE range includes contracting one or more of the first estimated CSE range, the additional estimated CSE ranges, or the estimated cumulative CSE range.

Example 17. The method of Examples 3 through 13 wherein the first estimated CSE range, the additional estimated CSE ranges, and the estimated cumulative CSE range remain fixed after being calculated.

Example 18. The method of any one of Examples 3 through 17 further comprising excluding from the calculation of the estimated cumulative CSE range an estimated CSE range, arising from a given signal arriving at the first sensor and the second sensor, that is incompatible with the estimated cumulative CSE range.

Example 19. The method of any one of Examples 3 through 18 further comprising, using the estimated cumulative CSE range, identifying one or more of an inaccurate estimate of a CSE drift rate, one or more inaccurate estimates of distances between sensors, or an inaccurate estimate of a signal propagation speed.

Example 20. The method of any one of Examples 1 through 19 further comprising: (d) receiving, retrieving, or calculating an estimated uncorrected time-difference-of-arrival (TDOA) for the first signal arriving (i) at the first sensor at the estimated first sensor location and (ii) at a third sensor at an estimated third sensor location, the third sensor being operatively coupled to a third clock; (e) calculating a first estimated clock synchronization error (CSE) range between the first clock and the third clock, said range extending (i) from an estimated minimum true TDOA (minTDOA), between the first estimated sensor location and the third estimated sensor location, minus an estimated maximum uncorrected TDOA for the first signal, (ii) to an estimated maximum true TDOA (maxTDOA), for the same general signal type as the first signal, between the first estimated sensor location and the third estimated sensor location minus an estimated minimum uncorrected TDOA for the first signal; and (f) using the first estimated CSE range (i) to perform a computerized calculation with respect to one or more time-dependent signals arriving at the first sensor or the third sensor, or (ii) to adjust one or both of the first or third clocks to compensate at least partly for a CSE within the first estimated CSE range.

Example 21. The method of Examples 20 wherein the computerized calculation uses the first estimated CSE range for further detecting, processing, filtering, isolating, identifying, classifying, source-separating, or source-locating one or more time-dependent signals arriving at the first sensor or the third sensor.

Example 22. The method of any one of Examples 20 or 21 further comprising: (g) receiving, retrieving, or calculating an estimated uncorrected time-difference-of-arrival (TDOA) for one or more subsequent additional signals at the first sensor and at the third sensor; (h) calculating one or more corresponding additional estimated clock synchronization error (CSE) ranges between the first clock and the third clock, each range extending (i) from a minTDOA, for the same general signal type as the corresponding additional signal, between the first estimated sensor location and the third estimated sensor location, minus a corresponding estimated maximum uncorrected TDOA for the corresponding additional signal, (ii) to a maxTDOA, for the same general signal type as the corresponding additional signal, between the first estimated sensor location and the third estimated sensor location minus a corresponding estimated minimum uncorrected TDOA for the corresponding additional signal; (i) calculating an estimated cumulative CSE range between the first clock and the third clock as a combination of two or more among the first estimated CSE range and the additional estimated CSE ranges; and (j) using the estimated cumulative CSE range (i) to perform a computerized calculation with respect to one or more time-dependent signals arriving at the first sensor or the third sensor, or (ii) to adjust one or both of the first or third clocks to compensate at least partly for a CSE within the estimated cumulative CSE range.

Example 23. The method of Examples 22 wherein the computerized calculation uses the estimated cumulative CSE range for further detecting, processing, filtering, isolating, identifying, classifying, source-separating, or source-locating one or more time-dependent signals arriving at the first sensor or the third sensor.

Example 24. The method of any one of Examples 1 through 23 wherein the first and second sensors are sonic sensors, and the first signal and additional signals arriving at the first and second sensors are sonic signals.

Example 25. The method of Example 24 wherein the first and second sensors are underwater and the first and additional signals propagate underwater.

Example 26. The method of any one of Examples 1 through 23 wherein the first and second sensors are electromagnetic sensors, and the first signal and addition signals arriving at the first and second sensors are electromagnetic signals.

Example 27. The method of Example 26 wherein the first and second sensors are UV, visible, or IR optical sensors, and the first and additional signals are UV, visible, or IR optical signals.

Example 28. The method of Example 26 wherein the first and second sensors are radiofrequency, microwave, millimeter wave, or terahertz sensors, and the first and additional signals are radiofrequency, microwave, millimeter wave, or terahertz signals.

Example 29. The method of any one of Examples 1 through 23 wherein the first and second sensors are seismic sensors, and the first signal and additional signals arriving at the first and second sensors are seismic signals.

Example 30. A programmed computerized machine comprising one or more electronic processors and one or more tangible computer-readable storage media operationally coupled to the one or more processors, the machine being structured and programmed to perform the method of any one of Examples 1 through 29.

Example 31. An article comprising a tangible medium that is not a propagating signal encoding computer-readable instructions that, when applied to a computerized machine, program the computerized machine to perform the method of any one of Examples 1 through 29.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. In another example, each of "a dog, a cat, or a mouse," "one or more of a dog, a cat, or a mouse," and "one or more dogs, cats, or mice" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. In another example, each of "two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method implemented using a programmed computerized machine, the method comprising:

(a) receiving, retrieving, or calculating an estimated uncorrected time-difference-of-arrival (TDOA) for a first signal arriving (i) at a first sensor that is estimated to be at an estimated first sensor location and (ii) at a second sensor that is estimated to be at an estimated second sensor location, the first sensor being operatively coupled to a first clock and the second sensor being operatively coupled to a second clock;

(b) calculating a first estimated clock synchronization error (CSE) range between the first clock and the second clock, said range extending (i) from an estimated minimum true TDOA (minTDOA), for the same general signal type as the first signal, between the first estimated sensor location and the second estimated sensor location, minus an estimated maximum uncorrected TDOA for the first signal, (ii) to an estimated maximum true TDOA (maxTDOA), for the same general signal type as the first signal, between the first estimated sensor location and the second estimated sensor location minus an estimated minimum uncorrected TDOA for the first signal; and (c) using the first estimated CSE range (i) to perform a computerized calculation with respect to one or more time-dependent signals arriving at the first sensor or the second sensor, or (ii) to adjust one or both of the first or second clocks to compensate at least partly for a CSE within the first estimated CSE range.

2. The method of claim 1 further comprising:

(d) receiving, retrieving, or calculating an estimated uncorrected time-difference-of-arrival (TDOA) for one or more subsequent additional signals at the first sensor and at the second sensor;

(e) calculating one or more corresponding additional estimated clock synchronization error (CSE) ranges between the first clock and the second clock, each range extending (i) from a minTDOA, for the same general signal type as the corresponding additional signal, between the first estimated sensor location and the second estimated sensor location, minus a corresponding estimated maximum uncorrected TDOA for the corresponding additional signal, (ii) to a maxTDOA, for the same general signal type as the corresponding additional signal, between the first estimated sensor location and the second estimated sensor location minus a corresponding estimated minimum uncorrected TDOA for the corresponding additional signal;

(f) calculating an estimated cumulative CSE range between the first clock and the second clock as a combination of two or more among the first estimated CSE range and the additional estimated CSE ranges; and (g) using the estimated cumulative CSE range (i) to perform a computerized calculation with respect to one or more time-dependent signals arriving at the first sensor or the second sensor, or (ii) to adjust one or both of the first or second clocks to compensate at least partly for a CSE within the estimated cumulative CSE range.

3. The method of claim 2 further comprising evolving, with respect to time elapsed before or after arrival of the corresponding signal at the first sensor and the second sensor, one or more of the first estimated CSE range, the additional estimated CSE ranges, or the estimated cumulative CSE range.

4. The method of claim 2 further comprising excluding from the calculation of the estimated cumulative CSE range an estimated CSE range, arising from a given signal arriving at the first sensor and the second sensor, that is incompatible with the estimated cumulative CSE range.

5. The method of claim 1 further comprising, using the first estimated CSE range or a cumulative estimated CSE range, calculating one or more corresponding estimated corrected TDOAs for the first signal or one or more additional signals at the first sensor or the second sensor.

6. The method of claim 1 further comprising, using the first estimated CSE range or a cumulative estimated CSE range, limiting a temporal window over which certain received signal waveforms from the first sensor or the second sensor are further processed, filtered, auto- or cross-correlated, or analyzed.

7. The method of claim 1 further comprising excluding from further processing or analysis a given signal arriving at the first sensor and the second sensor that results in an estimated uncorrected TDOA that is incompatible with the first estimated CSE range or an estimated cumulative CSE range.

8. The method of claim 1 further comprising:
(d) receiving, retrieving, or calculating an estimated uncorrected time-difference-of-arrival (TDOA) for the first signal arriving (i) at the first sensor that is estimated to be at the estimated first sensor location and (ii) at a third sensor that is estimated to be at an estimated third sensor location, the third sensor being operatively coupled to a third clock;
(e) calculating a first estimated clock synchronization error (CSE) range between the first clock and the third clock, said range extending (i) from an estimated minimum true TDOA (minTDOA), between the first estimated sensor location and the third estimated sensor location, minus an estimated maximum uncorrected TDOA for the first signal, (ii) to an estimated maximum true TDOA (maxTDOA), for the same general signal type as the first signal, between the first estimated sensor location and the third estimated sensor location minus an estimated minimum uncorrected TDOA for the first signal; and
(f) using the first estimated CSE range (i) to perform a computerized calculation with respect to one or more time-dependent signals arriving at the first sensor or the third sensor, or (ii) to adjust one or both of the first or third clocks to compensate at least partly for a CSE within the first estimated CSE range.

9. The method of claim 8 further comprising:
(g) receiving, retrieving, or calculating an estimated uncorrected time-difference-of-arrival (TDOA) for one or more subsequent additional signals at the first sensor and at the third sensor;
(h) calculating one or more corresponding additional estimated clock synchronization error (CSE) ranges between the first clock and the third clock, each range extending (i) from a minTDOA, for the same general signal type as the corresponding additional signal, between the first estimated sensor location and the third estimated sensor location, minus a corresponding estimated maximum uncorrected TDOA for the corresponding additional signal, (ii) to a maxTDOA, for the same general signal type as the corresponding additional signal, between the first estimated sensor location and the third estimated sensor location minus a corresponding estimated minimum uncorrected TDOA for the corresponding additional signal;
(i) calculating an estimated cumulative CSE range between the first clock and the third clock as a combination of two or more among the first estimated CSE range and the additional estimated CSE ranges; and
(j) using the estimated cumulative CSE range (i) to perform a computerized calculation with respect to one or more time-dependent signals arriving at the first sensor or the third sensor, or (ii) to adjust one or both of the first or third clocks to compensate at least partly for a CSE within the estimated cumulative CSE range.

10. The method of claim 1 wherein the first and second sensors are sonic sensors, and the first signal and additional signals arriving at the first and second sensors are sonic signals.

11. The method of claim 1 wherein the first and second sensors are electromagnetic sensors, and the first signal and additional signals arriving at the first and second sensors are electromagnetic signals.

12. The method of claim 1 wherein the first and second sensors are seismic sensors, and the first signal and additional signals arriving at the first and second sensors are seismic signals.

13. A programmed computerized machine comprising one or more electronic processors and one or more tangible computer-readable storage media operationally coupled to the one or more processors, the machine being structured and programmed to perform a method comprising:
(a) receiving, retrieving, or calculating an estimated uncorrected time-difference-of-arrival (TDOA) for a first signal arriving (i) at a first sensor that is estimated to be at an estimated first sensor location and (ii) at a second sensor that is estimated to be at an estimated second sensor location, the first sensor being operatively coupled to a first clock and the second sensor being operatively coupled to a second clock;
(b) calculating a first estimated clock synchronization error (CSE) range between the first clock and the second clock, said range extending (i) from an estimated minimum true TDOA (minTDOA), for the same general signal type as the first signal, between the first estimated sensor location and the second estimated sensor location, minus an estimated maximum uncorrected TDOA for the first signal, (ii) to an estimated maximum true TDOA (maxTDOA), for the same general signal type as the first signal, between the first estimated sensor location and the second estimated sensor location minus an estimated minimum uncorrected TDOA for the first signal; and
(c) using the first estimated CSE range (i) to perform a computerized calculation with respect to one or more time-dependent signals arriving at the first sensor or the second sensor, or (ii) to adjust one or both of the first or second clocks to compensate at least partly for a CSE within the first estimated CSE range.

14. The programmed computerized machine of claim 13 wherein the machine is further structured and programmed to:
(d) receive, retrieve, or calculate an estimated uncorrected time-difference-of-arrival (TDOA) for one or more subsequent additional signals at the first sensor and at the second sensor;
(e) calculate one or more corresponding additional estimated clock synchronization error (CSE) ranges between the first clock and the second clock, each range extending (i) from a minTDOA, for the same general signal type as the corresponding additional signal, between the first estimated sensor location and the second estimated sensor location, minus a corresponding estimated maximum uncorrected TDOA for the corresponding additional signal, (ii) to a maxTDOA, for the same general signal type as the corresponding additional signal, between the first estimated sensor location and the second estimated sensor location minus a corresponding estimated minimum uncorrected TDOA for the corresponding additional signal;

(f) calculate an estimated cumulative CSE range between the first clock and the second clock as a combination of two or more among the first estimated CSE range and the additional estimated CSE ranges; and (g) use the estimated cumulative CSE range (i) to perform a computerized calculation with respect to one or more time-dependent signals arriving at the first sensor or the second sensor, or (ii) to adjust one or both of the first or second clocks to compensate at least partly for a CSE within the estimated cumulative CSE range.

15. The programmed computerized machine of claim 13 wherein the machine is further structured and programmed to calculate, using the first estimated CSE range or a cumulative estimated CSE range, one or more corresponding estimated corrected TDOAs for the first signal or one or more additional signals at the first sensor or the second sensor.

16. The programmed computerized machine of claim 13 wherein the machine is further structured and programmed to limit, using the first estimated CSE range or a cumulative estimated CSE range, a temporal window over which certain received signal waveforms from the first sensor or the second sensor are further processed, filtered, auto- or cross-correlated, or analyzed.

17. The programmed computerized machine of claim 13 wherein the machine is further structured and programmed to exclude from further processing or analysis a given signal arriving at the first sensor and the second sensor that results in an estimated uncorrected TDOA that is incompatible with the first estimated CSE range or an estimated cumulative CSE range.

18. An article comprising a tangible medium that is not a propagating signal encoding computer-readable instructions that, when applied to a computerized machine, program the computerized machine to perform a method comprising:

(a) receiving, retrieving, or calculating an estimated uncorrected time-difference-of-arrival (TDOA) for a first signal arriving (i) at a first sensor that is estimated to be at an estimated first sensor location and (ii) at a second sensor that is estimated to be at an estimated second sensor location, the first sensor being operatively coupled to a first clock and the second sensor being operatively coupled to a second clock;

(b) calculating a first estimated clock synchronization error (CSE) range between the first clock and the second clock, said range extending (i) from an estimated minimum true TDOA (minTDOA), for the same general signal type as the first signal, between the first estimated sensor location and the second estimated sensor location, minus an estimated maximum uncorrected TDOA for the first signal, (ii) to an estimated maximum true TDOA (maxTDOA), for the same general signal type as the first signal, between the first estimated sensor location and the second estimated sensor location minus an estimated minimum uncorrected TDOA for the first signal; and (c) using the first estimated CSE range (i) to perform a computerized calculation with respect to one or more time-dependent signals arriving at the first sensor or the second sensor, or (ii) to adjust one or both of the first or second clocks to compensate at least partly for a CSE within the first estimated CSE range.

19. The article of claim 18 wherein the instructions further cause the computerized machine to:

(d) receive, retrieve, or calculate an estimated uncorrected time-difference-of-arrival (TDOA) for one or more subsequent additional signals at the first sensor and at the second sensor;

(e) calculate one or more corresponding additional estimated clock synchronization error (CSE) ranges between the first clock and the second clock, each range extending (i) from a minTDOA, for the same general signal type as the corresponding additional signal, between the first estimated sensor location and the second estimated sensor location, minus a corresponding estimated maximum uncorrected TDOA for the corresponding additional signal, (ii) to a maxTDOA, for the same general signal type as the corresponding additional signal, between the first estimated sensor location and the second estimated sensor location minus a corresponding estimated minimum uncorrected TDOA for the corresponding additional signal;

(f) calculate an estimated cumulative CSE range between the first clock and the second clock as a combination of two or more among the first estimated CSE range and the additional estimated CSE ranges; and (g) use the estimated cumulative CSE range (i) to perform a computerized calculation with respect to one or more time-dependent signals arriving at the first sensor or the second sensor, or (ii) to adjust one or both of the first or second clocks to compensate at least partly for a CSE within the estimated cumulative CSE range.

20. The article of claim 18 wherein the instructions further cause the computerized machine to calculate, using the first estimated CSE range or a cumulative estimated CSE range, one or more corresponding estimated corrected TDOAs for the first signal or one or more additional signals at the first sensor or the second sensor.

21. The article of claim 18 wherein the instructions further cause the computerized machine to limit, using the first estimated CSE range or a cumulative estimated CSE range, a temporal window over which certain received signal waveforms from the first sensor or the second sensor are further processed, filtered, auto- or cross-correlated, or analyzed.

22. The article of claim 18 wherein the instructions further cause the computerized machine to exclude from further processing or analysis a given signal arriving at the first sensor and the second sensor that results in an estimated uncorrected TDOA that is incompatible with the first estimated CSE range or an estimated cumulative CSE range.

* * * * *